United States Patent
Hankui et al.

(10) Patent No.: US 7,164,898 B2
(45) Date of Patent: Jan. 16, 2007

(54) WIRELESS PORTABLE DEVICE

(75) Inventors: Eiji Hankui, Tokyo (JP); Toshihide Kuriyama, Tokyo (JP)

(73) Assignee: NEC Corporation, Tokyo (JP)

( * ) Notice: Subject to any disclaimer, the term of this patent is extended or adjusted under 35 U.S.C. 154(b) by 296 days.

(21) Appl. No.: 10/474,756

(22) PCT Filed: Apr. 10, 2002

(86) PCT No.: PCT/JP02/03586

§ 371 (c)(1),
(2), (4) Date: Oct. 10, 2003

(87) PCT Pub. No.: WO02/084784

PCT Pub. Date: Oct. 24, 2002

(65) Prior Publication Data

US 2004/0127249 A1    Jul. 1, 2004

(30) Foreign Application Priority Data

Apr. 12, 2001 (JP) .............................. 2001-114391

(51) Int. Cl.
*H04B 1/10* (2006.01)
(52) U.S. Cl. ..................... 455/311; 455/312
(58) Field of Classification Search ............. 455/501, 455/63.1, 296, 333, 311, 312; 361/736, 748, 361/750, 814
See application file for complete search history.

(56) References Cited

U.S. PATENT DOCUMENTS

| | | | | |
|---|---|---|---|---|
| 5,453,713 A | * | 9/1995 | Partovi et al. | 327/565 |
| 6,121,827 A | * | 9/2000 | Khoini-Poorfard et al. | 327/565 |
| 6,166,457 A | * | 12/2000 | Iguchi et al. | 307/91 |
| 6,194,913 B1 | * | 2/2001 | Verkinderen et al. | 326/83 |
| 6,335,866 B1 | * | 1/2002 | Ohtaki et al. | 361/784 |
| 6,469,259 B1 | * | 10/2002 | Takeshita et al. | 174/261 |

FOREIGN PATENT DOCUMENTS

| | | |
|---|---|---|
| JP | 8-321720 A | 12/1996 |
| JP | 9-18205 A | 1/1997 |
| JP | 11-274818 A | 10/1999 |

* cited by examiner

*Primary Examiner*—Nguyen T. Vo
(74) *Attorney, Agent, or Firm*—Sughrue Mion, PLLC

(57) ABSTRACT

A current restriction structure for restricting a higher-harmonic-wave current generated in a digital circuit block from entering a radio circuit block and/or a radio-frequency current generated in the radio circuit block from entering the digital circuit block is disposed between the radio circuit block and the digital circuit block. The current restriction structure is formed by one or two of equivalent rectangular cylindrical metallic tube including metallic planes overlying/underlying the ground layer and a narrow-pitch via-hole array, which are disposed to enclose the subject current to be restricted and have a short-circuited distal end. The distance between the open plane of the equivalent rectangular cylindrical metallic tube and the short-circuiting plate is set at ¼ of the wavelength of the subject current to be restricted.

16 Claims, 22 Drawing Sheets

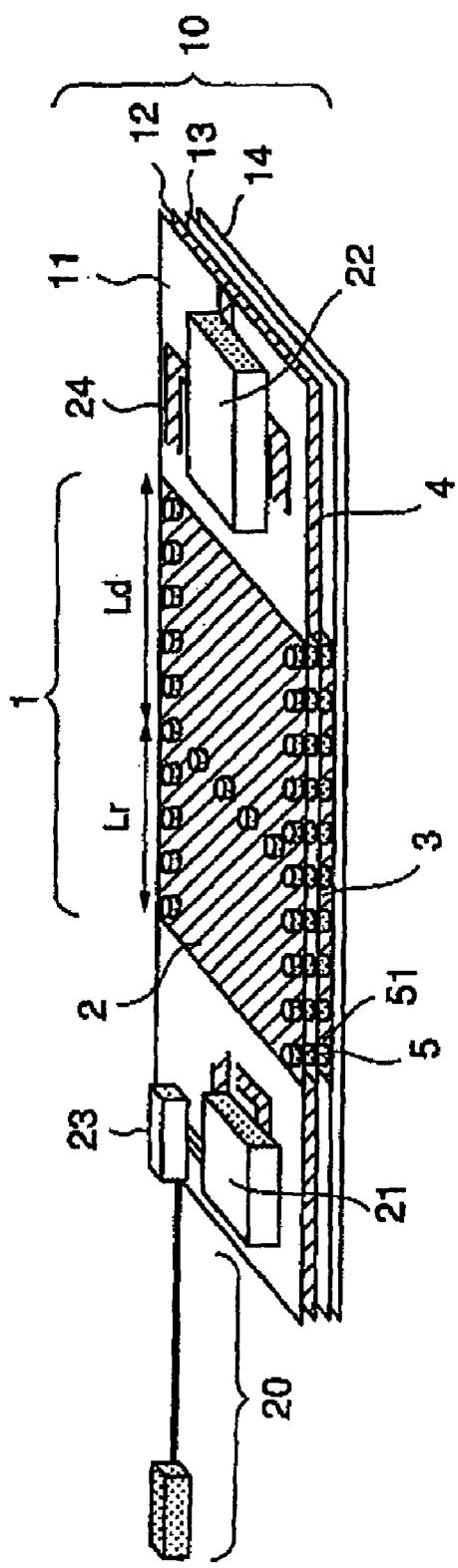
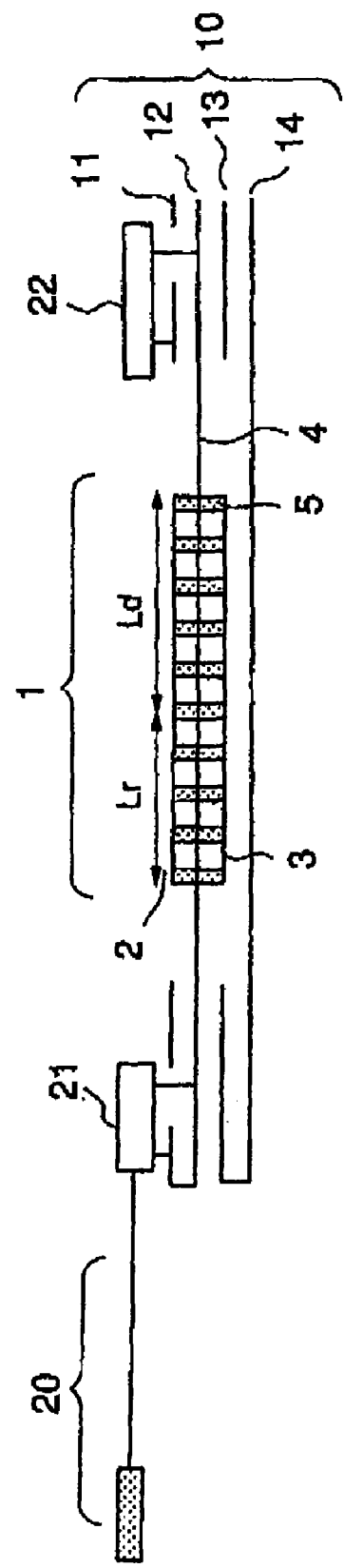
Fig. 1A
Fig. 1B

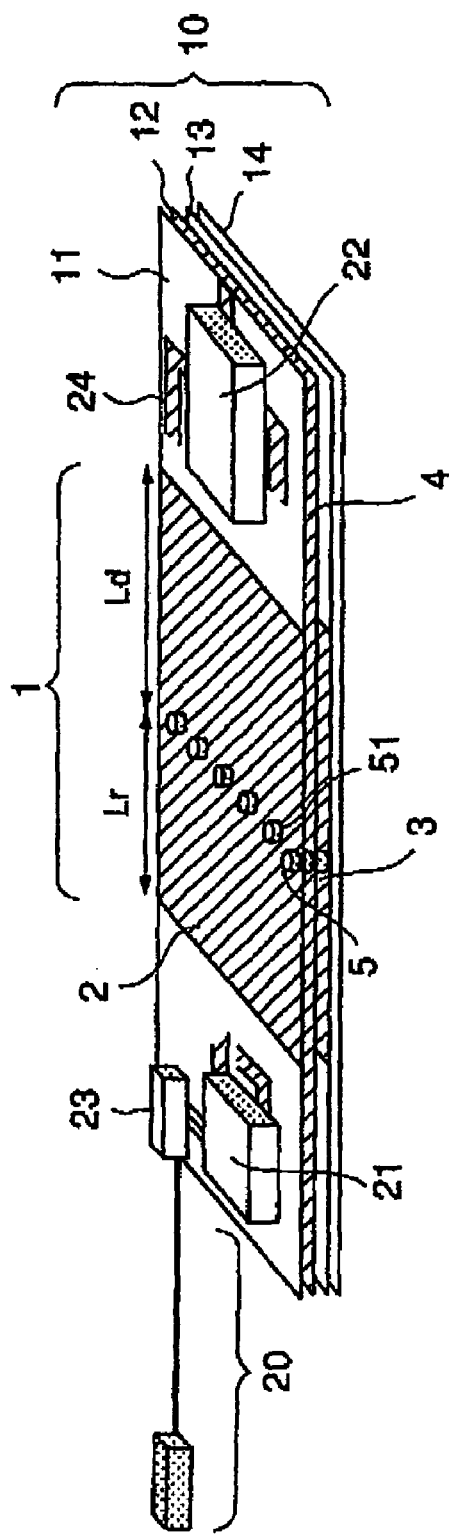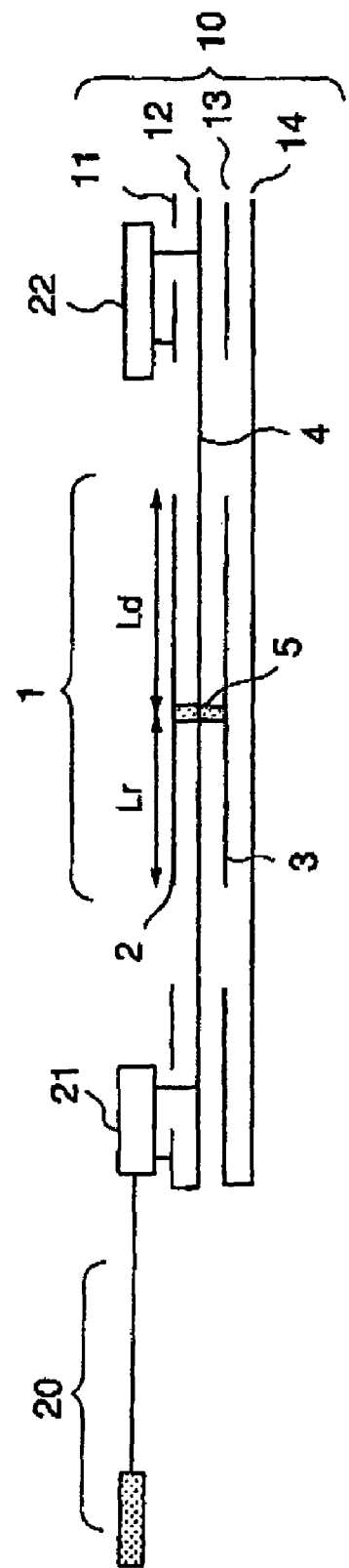
Fig. 5A
Fig. 5B

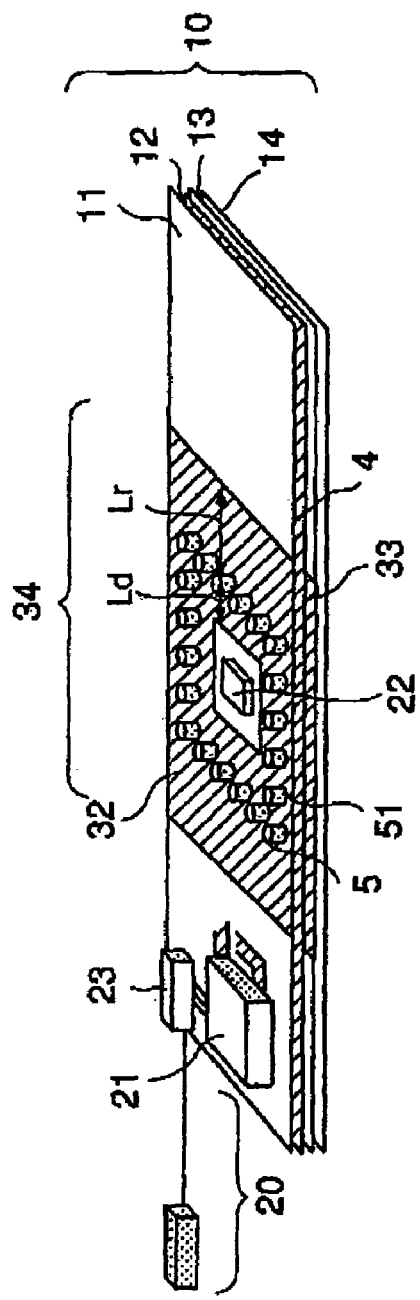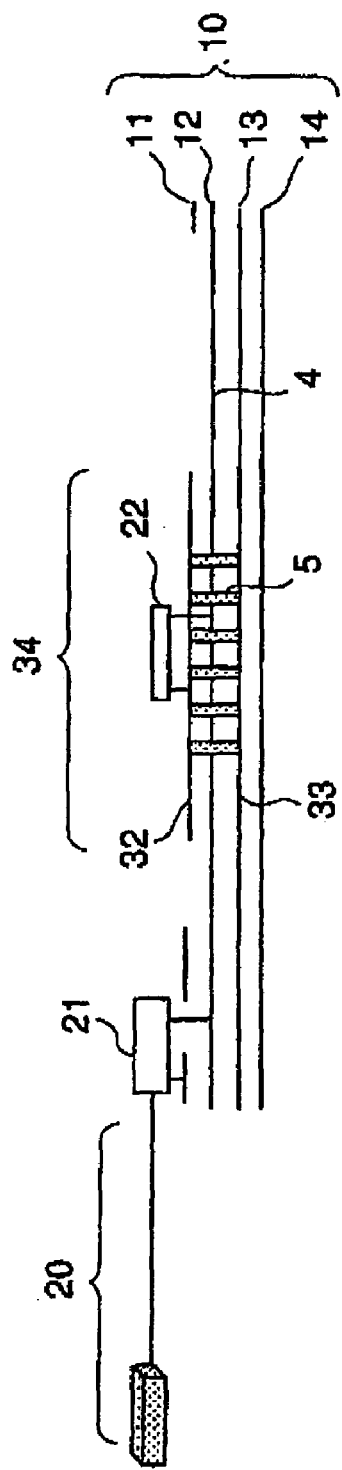
Fig. 14A
Fig. 14B

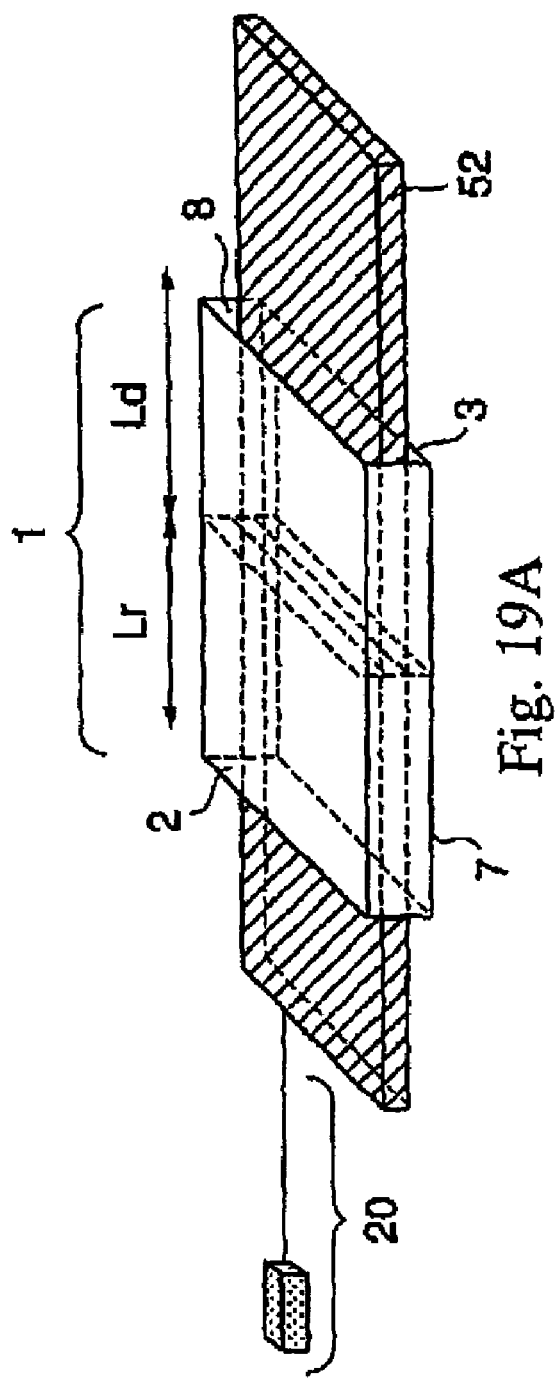
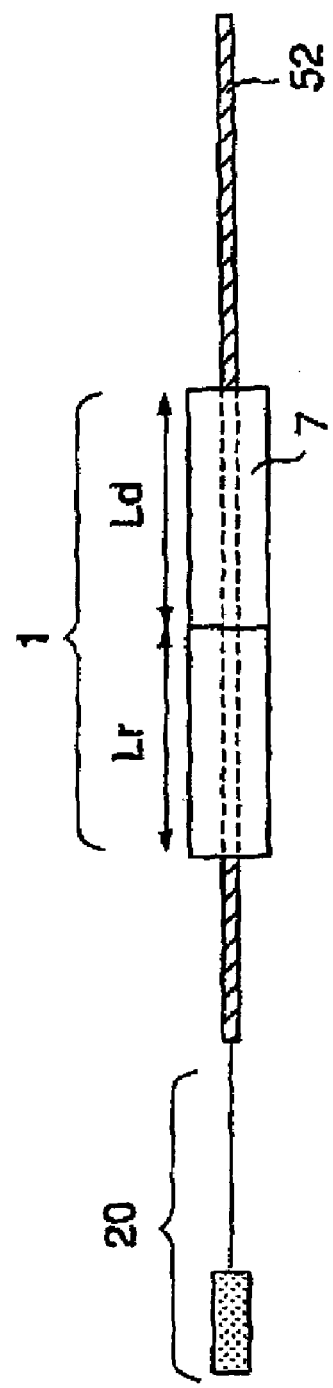
Fig. 19A
Fig. 19B

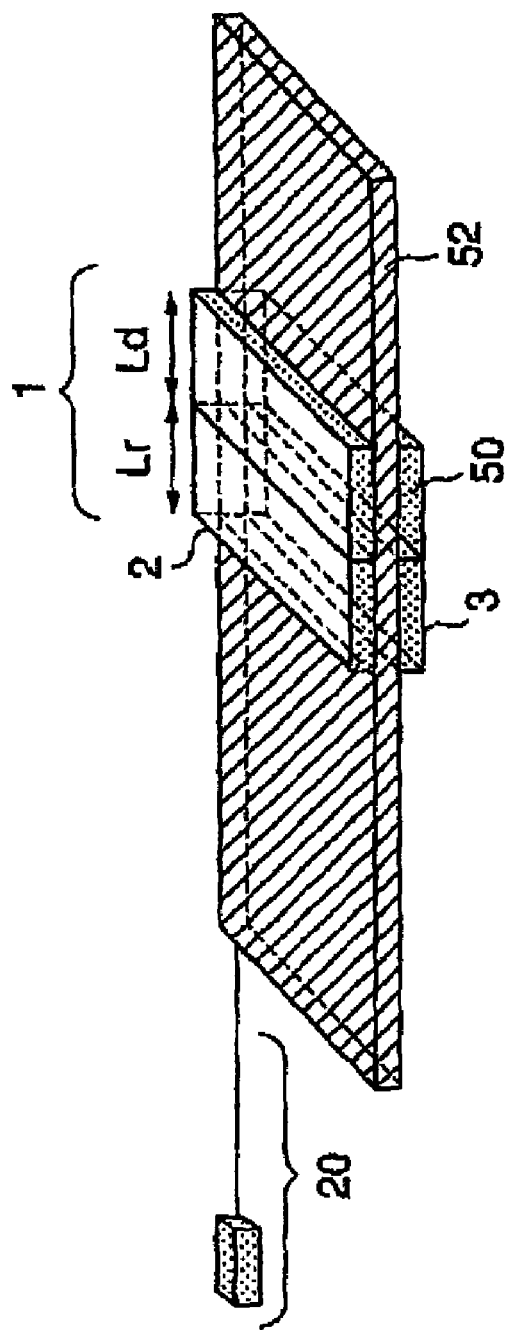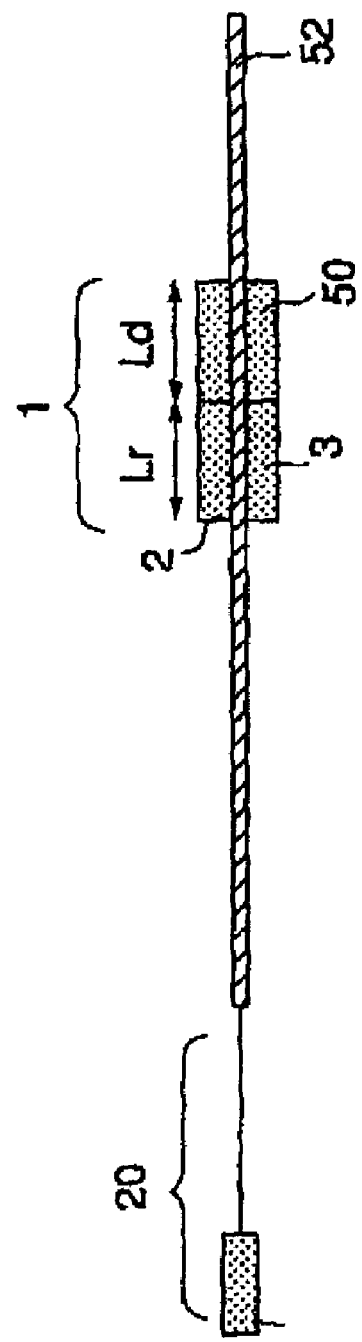
Fig. 20A
Fig. 20B

WIRELESS PORTABLE DEVICE

TECHNICAL FIELD

The present invention relates to a wireless portable device such as personal data assistant and, more particularly, to a technique for suppressing electromagnetic coupling between a radio circuit block and a digital circuit block.

TECHNICAL BACKGROUND

Wireless portable devices such as mobile phone and personal digital assistant have become popular due to the convenient properties thereof, and the thickness and size thereof have been remarkably reduced in these years. FIG. 21A and FIG. 21B are perspective view and side view, respectively, showing the basic structure of a typical, conventional wireless portable device, and FIG. 21C is an exploded perspective view showing each layer structure of a printed circuit board therein. In these figures, a four-layer circuit board is exemplified, wherein a package casing for receiving therein the printed circuit board is not depicted for simplification purpose.

The wireless portable device includes an antenna block 20, a feeding block 23, a radio circuit block 21, and a digital circuit block 23, which are mounted on the printed circuit board. The antenna bock 20 transmits and receives radio waves that are used as signals upon communication with a base station etc. The feeding block 23 delivers signals to the antenna bock 20, and transmits signals supplied through the antenna block 20 to the circuit blocks. The radio circuit block 21 processes signals that are transmitted or received through the antenna block 20. The digital circuit block 22 processes digital signals that are used for data processing. Generally, a multi-layered circuit board having multiple layers is used as the printed circuit board 10. The ground layer formed as an internal layer of the printed circuit board 10 is used as the common ground for the radio circuit block 21 and digital circuit block 22. The printed circuit board used herein includes a first layer 11 as a signaling layer, a second layer 12 as the ground layer, a third layer 13 as a power source layer, and a fourth layer 14 as another signaling layer, which are disposed in this order as viewed from the first layer 11 mounting thereon components. It is to be noted that only some of circuit patterns 24 are depicted on the third and fourth layers for simplification purpose (FIG. 21C). Generally, the spaces between these layers are filled with a dielectric material (not shown) such as a glass epoxy material.

In the wireless portable device as described above, if there are a plurality of transmission channels provided in the same circuit board, and the distance between adjacent transmission channels is short, interaction therebetween may be generated to cause an electromagnetic coupling. An example of the methods which can solve such a problem is described in Patent Publication JP-A-58-092101. In this method, metallized through-halls are provided between the transmission lines, which should be isolated from one another, for connecting together the upper ground conductor and the lower ground conductor, whereby electric isolation is attempted between adjacent transmission lines.

In Patent Publication JP-A-10-75108, a dielectric waveguide-tube transmission line is described which is formed by the area encircled by two arrayed via-hall groups which electrically connect together the conductor layers. This technique features a subordinary conductor layer formed parallel to the conductor layers and electrically connected to the via-holes. It is attempted to improve the transmission characteristic therein by introducing such a subordinary conductor layer. Similar conductor via-halls are used in Patent Publication JP-A-9-46008. This publication describes the technique wherein the length of a stub located on the periphery of the ground pattern is made to be less than ¼ of the wavelength of the high-frequency signal transmitted through the signal transmission line. The term "stub" as used herein means an edge that is not electrically connected to the ground pattern directly. By adopting such a configuration, a high-frequency-wave wiring board can be obtained having a reduced influence on the high-frequency signals transmitted through the signal lines.

It is to be noted that a structure such as shown in FIGS. 22A and 22B may be used for restricting the current flowing on the cable. FIG. 22A is a perspective view, and FIG. 22B is a sectional view taken at the central plane of the cable. In this configuration, one of the ends of a metallic hollow cylinder 41 is short-circuited by a metallic plate 42, and the metallic hollow cylinder 41 is disposed to cover the cable 43. The length Lc of the hollow cylinder is set at ¼ of the wavelength of the current transferred through the tube. In this example depicted, the short-circuiting plate is connected to the right end to form an electrically short-circuited plane, whereas the left end constitutes an open plane. In general, the position apart from the short-circuited plane by ¼ of the wavelength is an open plane (open end), wherein the input impedance Zin at the position of the open plane as viewed from the A-side in the drawing assumes a higher value. Accordingly, the current I flowing from the A-side toward the B-side is suppressed by the effect of the higher impedance of the open plane of the structure depicted in these figures, if it is provided therebetween.

In general, the frequencies of the signals to be handled are different between the radio circuit block and the digital circuit block. For example, the radio circuit block handles transmitted/received signals having frequencies around 1 GHz (may be around 2 GHz instead, depending on the device). On the other hand, the digital circuit block handles a clock signal having a fundamental wave of around 10 GHz, which generates higher-harmonic frequencies equal to the integral multiples of the frequency of the fundamental wave. Thus, the ground layer common to both the circuit blocks receives thereon a mixture of the transmitted/received signals of around 1 GHz (or around 2 GHz) generated from the radio circuit block and the fundamental-wave and the higher-harmonic-wave signals generated from the digital circuit block. As a result, there is a tendency that the radio circuit block and the digital circuit block are susceptible to the influence by the electromagnetic coupling due to the signals of each other.

For example, it is probable that the higher-harmonic-wave current generated in the digital circuit block and transferred through the ground layer enters a device, such as the IC, in the radio circuit block. On the other hand, it is also probable that the high-frequency current (radio-frequency-wave current) around 1 GHz generated in the radio circuit block enters the digital circuit block. In the wireless portable device having reduced size and thickness, it is general that the radio circuit blocks and the digital circuit blocks are mixed on a single circuit board in a closed relationship therebetween. Thus, the electromagnetic coupling generated between the radio circuit block and the digital circuit block tends to become more critical. It has been desired to effectively suppress the electromagnetic coupling between the radio circuit block and the digital circuit block for assuring a reliable quality in such a wireless portable device. In the above conventional techniques, there is no teaching to effectively solve the problem while noting the electromagnetic coupling of the signals having different frequencies between the radio circuit block and the digital circuit block.

DISCLOSURE OF THE INVENTION

The present invention provides a wireless portable device that can suppress the electromagnetic coupling between the radio circuit block and the digital circuit block, by applying the technique shown in FIGS. 22A and 22B to a multi-layer structure of a printed circuit board. More specifically, in the conventional wireless portable device shown in FIG. 22, a metallic plane (a metallic hollow cylinder in the example shown in this figure) is configured to enclose the current flowing on a transmission line such as a cable, and the distal end thereof is formed as a short-circuited plane. In addition thereto, by setting the length of the metallic plane constituting the transmission line equal to ¼ of the wavelength of the current flowing within the tube, the impedance of the opening assumes a higher value. This allows restriction of the current flowing from a transmission line connected to the open plane side toward another transmission line connected to the distal end side. In the present invention, a structure equivalently having this configuration is disposed between the digital circuit block and the radio circuit block mounted on the printed circuit board, thereby increasing the impedance at the position of the open plane. This restricts the current generated from one of the circuit blocks and transferred through the ground layer from entering the other of the circuit blocks, thereby suppressing the electromagnetic coupling between the digital circuit block and the radio circuit block.

In the wireless portable device of the present invention, a current restriction structure is provided for suppressing such an electromagnetic coupling. The current restriction structure is comprised of a first metallic plane, a second metallic plane and an equivalent metallic plane implemented by a via-hole array. The first metallic plane is disposed as an overlying layer parallel to the printed circuit board mounting thereon the radio circuit block and the digital circuit block. The second metallic plate is disposed as an underlying layer parallel to the printed circuit board. The equivalent metallic plane implemented by the via-hole array is formed by arranging via-holes on a straight line at a narrow pitch on the above first and second metallic planes. Such an equivalent metallic plane implemented by the via-hole array is disposed at the position apart from both the ends of each of the first and second metallic planes by a distance equal to ¼ of the wavelength of the subject current to be restricted. Such an equivalent metallic plane acts as a short-circuiting plate for electrically connecting together the first and second metallic planes and the ground layer on the printed circuit board. In addition, equivalent metallic planes are also disposed on both the lateral sides of the first and second metallic planes (although a configuration without them is also possible). Using such a configuration, only the upper and lower metallic planes are connected together without connecting the ground layer thereto. By using the above configurations, a rectangular cylindrical metallic tube is formed which equivalently encloses therein the ground layer. The subject current to be restricted is a radio-frequency current generated from the radio circuit block or a higher-harmonic-wave current generated from the digital circuit block, or includes both the currents. The rectangular cylindrical metallic tube may have a structure suited to the current to be restricted. More concretely, the configuration my be such that a single rectangular cylindrical metallic tube is provided, or such that two rectangular metallic plates are provided back to back with the short-circuiting plate being common thereto.

As an example of applications of the current restriction structure, it is possible to configure the first and second metallic planes and the equivalent metallic plane to form a □-shape, wherein the □-shape encircles therein the digital circuit block or the radio circuit block at the center thereof. In such a case, the basic principle is also similar to that as described above. For strengthening the connection or enhancing the function as the short-circuiting plate, a part or whole of the via-hole array may be arranged in a plurality of rows. Further, the first and second metallic planes may be respectively included in the signaling layer or the power source layer. The effects of the present invention can be obtained so long as the overlying and underlying metallic planes are provided to sandwich therebetween the printed circuit board. Further, even in the case wherein the printed circuit board is received in a metallic package casing, the current restriction structure of the present invention can be applied thereto while assuming that the package casing is the ground layer of the printed circuit board.

BRIEF DESCRIPTION OF THE DRAWINGS

FIGS. 1A and 1B are perspective view and side view, respectively, of a wireless portable device according to a first embodiment of the present invention.

FIGS. 5A and 5B are perspective view and side view, respectively, of a wireless portable device according to a second embodiment of the present invention.

FIGS. 14A and 14B are perspective view and side view, respectively, of a wireless portable device according to a sixth embodiment of the present invention.

FIGS. 19A and 19B are perspective view and side view, respectively, of a wireless portable device according to an eighth embodiment of the present invention.

FIGS. 20A and 20B are perspective view and side view, respectively, of a wireless portable device according to a ninth embodiment of the present invention.

BEST MODES FOR CARRYING OUT THE INVENTION

Embodiments of the wireless portable device according to the present invention will be described in detail with reference to the drawings. Each printed circuit board shown herein is a four-layer circuit board (first layer/signaling layer; second layer/ground layer; third layer/power source layer; and fourth layer/signaling layer), similarly to the structure of the conventional device. The space between adjacent layers of the circuit board is filled with a dielectric material such as a glass epoxy material etc., although not specifically depicted. The via-hole used herein is such that a conductive layer is formed around an air hole. The via-hole penetrating a metallic pattern is thereby connected to the metallic pattern. It is to be noted that aligned positions of the layers at which a via-hole penetrates are provided with holes to be used for the via-holes.

Figure 2:
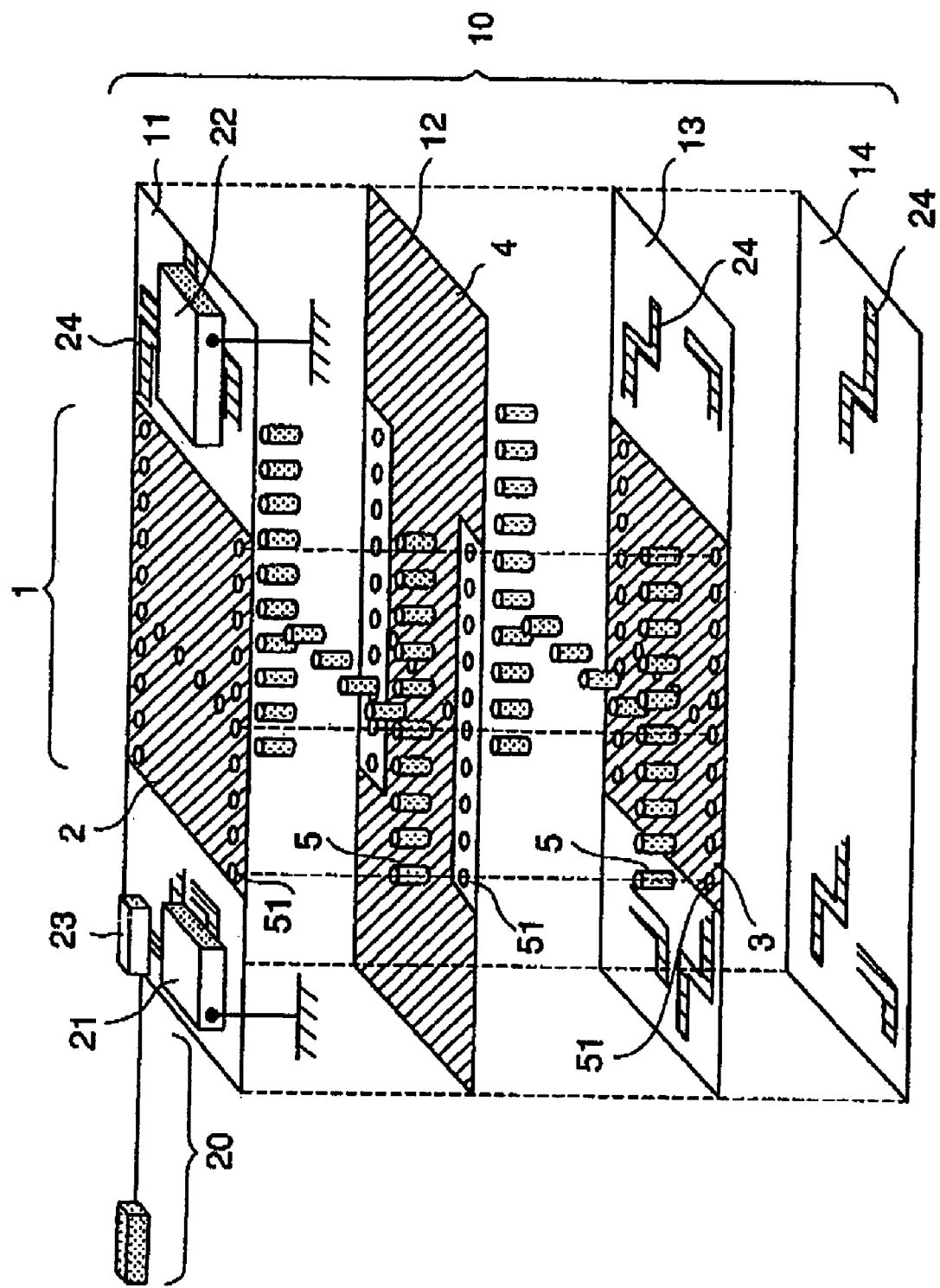
FIG. 2 is an exploded perspective view showing the structure of each layer of the printed circuit board of the wireless portable device according to the first embodiment of the present invention.

Referring to FIGS. 1A, 1B and 2 showing a first embodiment of the present invention, the wireless portable device of the present embodiment has a configuration wherein, for isolation of a radio circuit block 21 from a digital circuit block 22, a current restriction structure 1 is mounted between both the circuit blocks disposed in a printed circuit board. The current restriction structure 1 includes metallic planes 2 and 3 disposed parallel to the overlying and underlying layers (first layer and third layer) so as to sandwich therebetween the ground layer. Arrays of via-holes 5 are formed to extend along straight lines on both lateral sides of the metallic planes (the locations of the metallic planes roughly corresponding to the ends of the printed circuit board as viewed in the direction normal to the direction connecting together the radio circuit block and the digital circuit block), and formed at a location which is apart by desired distances (Lr and Ld) from both the ends of the metallic planes as viewed in the direction connecting together the radio circuit block and the digital circuit block.

The ground layer 4 is configured to have a width somewhat smaller than the width of a portion of the metallic planes sandwiched between the via-hole arrays. Accordingly, the width of this portion of the metallic planes is somewhat larger than the width of the ground layer. The overlying metallic plane 2 and the underlying metallic plane 3 have the same dimensions, wherein the length thereof as viewed in the direction connecting together the radio circuit block and the digital circuit block is L (=Lr+Ld), and the width in the direction normal thereto is same as the width of the circuit board. Each of these metallic planes is obtained by combining two metallic strips (a metallic strip having a length of Lr and located on the side of radio circuit block, and another metallic strip having a length of Ld and located on the side of the digital circuit block) at the via-hole array as the boundary therebetween, as will be described later.

The lengths of Lr and LdB of the metallic strips are set at ¼ of the wavelengths of the subject current to be restricted. For example, assuming that fr is the frequency of the radio-frequency current (corresponding to a wavelength of λr) to be restricted from entering the digital circuit block out of the radio circuit block, and that fd is the frequency of the higher-harmonic-wave current (corresponding to a wavelength of λd) to be restricted from entering the radio circuit block out of the digital circuit block, the Lr and Ld are expressed by the following equations:

$$Lr = \lambda r/4 = (c_0/fr)/4 \qquad (1), \text{ and}$$

$$Ld = \lambda d/4 = (c_0/fd)/4 \qquad (2),$$

wherein co is the velocity of light ($3 \times 10^8$ m/s).

As depicted, the via-holes penetrate from the first layer to the third layer, wherein the via-holes disposed Lr apart from one end of the metallic planes (disposed Ld apart from the other end) electrically connect together the overlying and underlying metallic planes and the ground layer. In addition, the via-holes disposed on both lateral sides of the metallic planes electrically connect together the overlying and underlying metallic planes (without connecting to the ground layer). That the via-holes disposed on both lateral sides of the metallic plane do not connect the ground layer results from the fact that the width of the metallic planes is larger than the ground width at the position and thus the via-holes penetrate the printed circuit board without penetrating the ground layer.

Figure 3A:
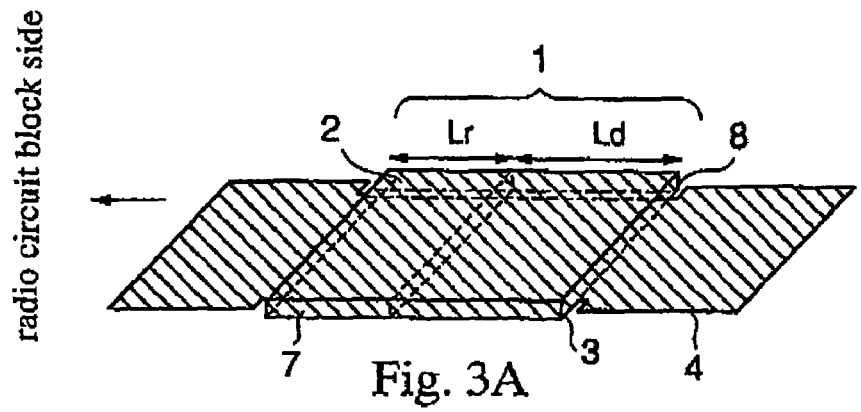
FIGS. 3A and 3B are perspective view and side view, respectively, of the equivalent current restriction structure in the wireless portable device according to the first embodiment of the present invention.
Figure 3B:
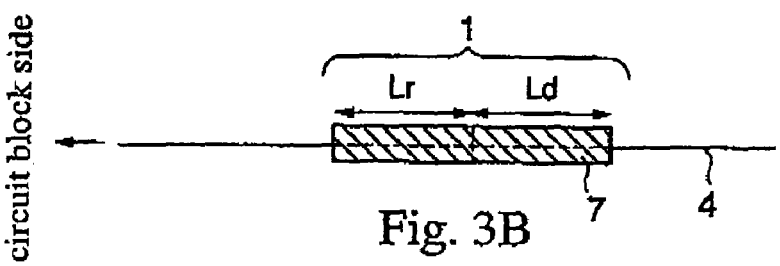
Figure 3C:
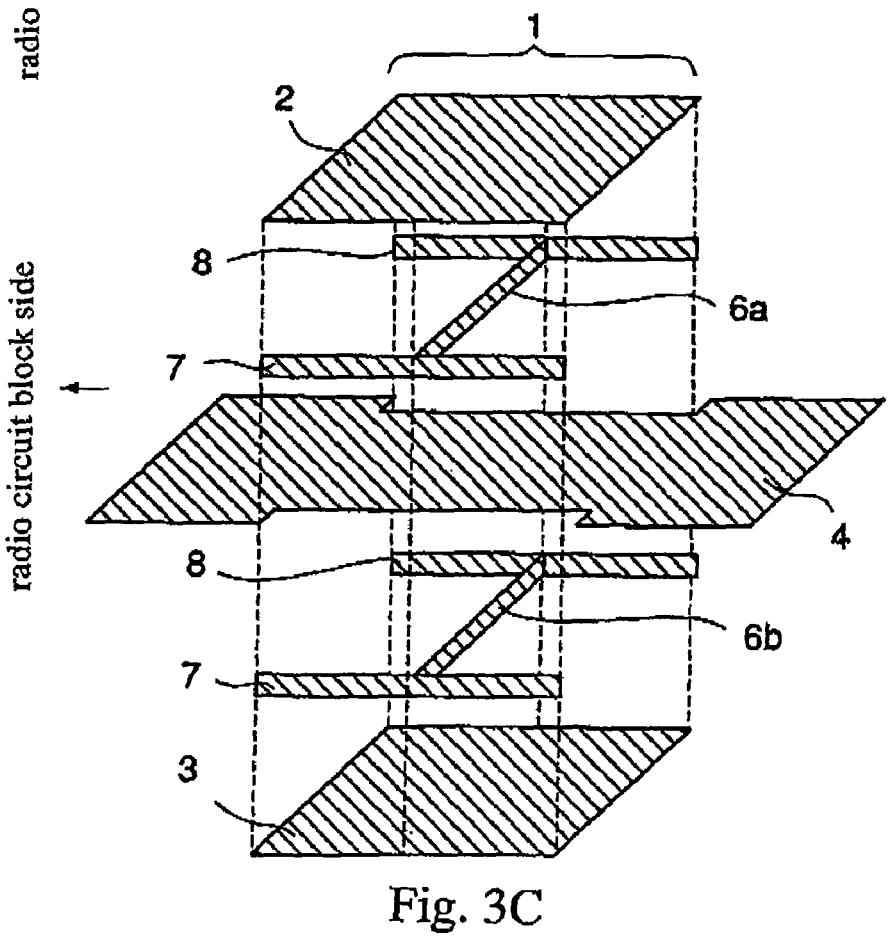
FIG. 3C is an exploded perspective view showing the structure of each layer of the printed circuit board.

In the present invention, the spacing between the adjacent via-holes is significantly shorter than the wavelength to be considered, whereby the via-holes are disposed at a narrow pitch or at a high density. This allows the via-hole array to be construed as an equivalent metallic plate. In consideration of this fact, the current restriction structure 1 can be equivalently expressed by the structure of a rectangular cylindrical metallic tube shown in FIG. 3, wherein only the current restriction structure is depicted. The via-hole array located on both the lateral sides of the metallic planes is equivalently expressed by metallic strips 7 (7a/7b) and 8 (8a/8b) which couple together the overlying and underlying metallic planes. Thus, the configuration is equivalently such that the ground layer is completely enclosed within the four metallic planes (overlying metallic plane 2, underlying metallic plane 3, and both the side metallic planes 7 and 8). In other words, the configuration is such that the ground layer is covered by a rectangular cylindrical metallic tube. The via-hole array which is Lr apart from one end of the metallic plane (and at the same time, Ld apart from the other end) is equivalently expressed by a short-circuiting plate 6 (6a and 6b) which connects together the overlying and underlying metallic planes and the ground layer.

Figure 4:
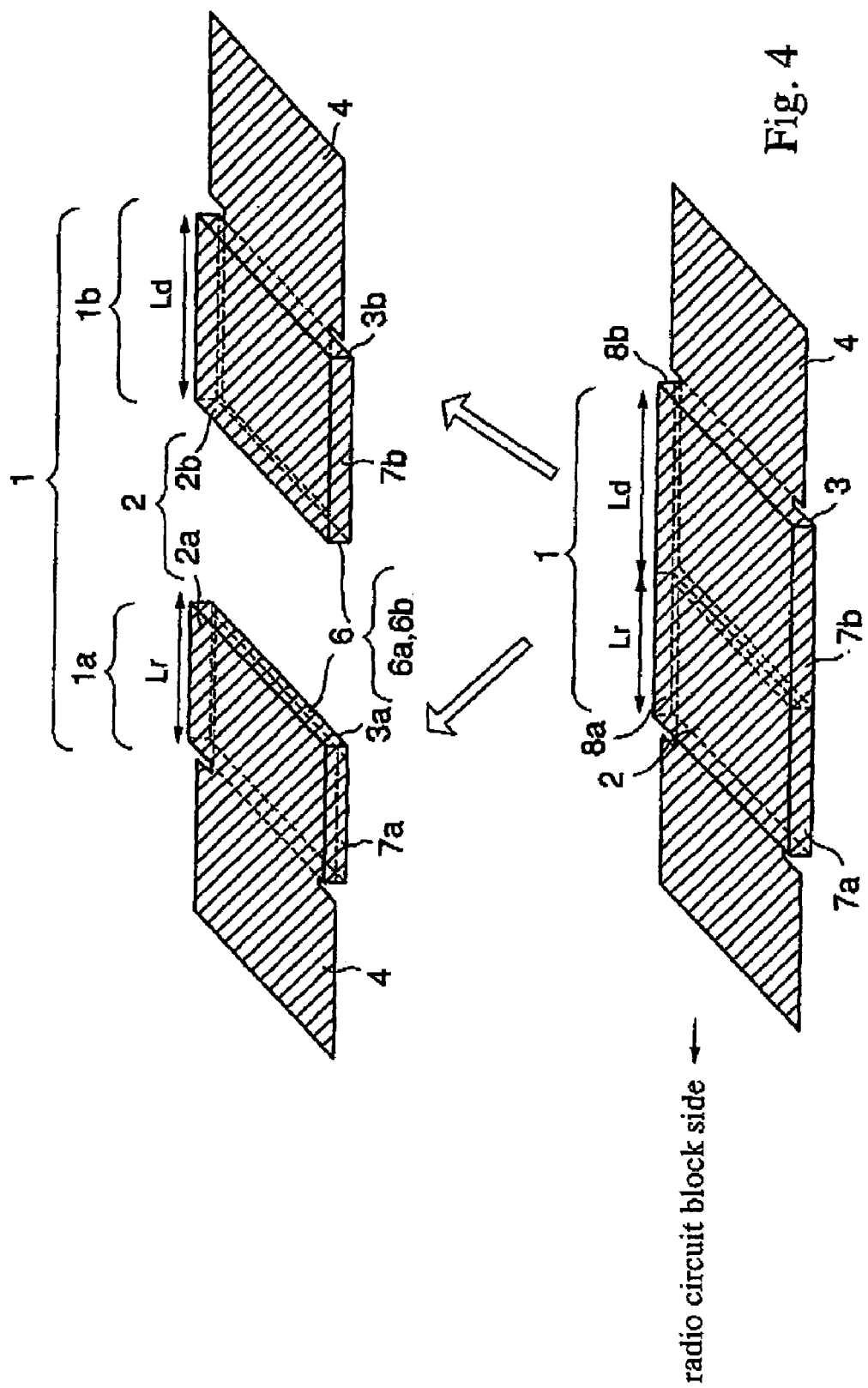
FIG. 4 shows first and second current restriction structures in the wireless portable device according to the first embodiment of the present invention.

As understood from FIGS. 1A, 1B, 2, and 3A to 3C, such a configuration can be construed as two current restriction units (two rectangular cylindrical metallic tubes) juxtaposed with each other, with the via-hole array (short-circuiting plate 6) having the configuration as described above being the boundary. More specifically, as shown in FIG. 4, the configuration can be construed such that the first current restriction unit 1a is disposed on the radio circuit block side, whereas the second current restriction unit 1b is disposed on the digital circuit block side, with the short-circuiting plates 6 configured as the via-hole array being disposed back to back.

The first current restriction unit 1a has a configuration wherein the distal end thereof as viewed from the radio circuit block is short-circuited. The metallic strips formed as the overlying, underlying and side layers for the ground layer have a length (Lr) equal to ¼ of the wavelength, $\lambda r$, of the subject radio-frequency current in the direction connecting together the radio circuit block and the digital circuit block. In this manner, the current restriction unit has a configuration wherein a transmission line (having a short-circuited distal end) is formed to enclose therein a ground layer, and the transmission line has a length of $\lambda r/4$. Thus, the input impedance against the radio circuit block is higher at the position of the open plane of the first current restriction unit 1a. The effect of this higher impedance is that the radio-frequency current generated from the radio circuit block and transferring through the ground layer is prevented from flowing toward the digital circuit block, whereby the electromagnetic coupling can be suppressed. On the other hand, the second current restriction unit 1b has a configuration wherein the distal end thereof as viewed from the digital circuit block is shortcircuited. The metallic strips formed as the overlying, underlying and side layers for the ground layer have a length (Ld) equal to ¼ of the wavelength, $\lambda d$, of the subject higher-harmonic-wave current in the direction connecting together the radio circuit block and the digital circuit block. Thus, also in this case, the input impedance against the digital circuit block is higher at the position of the open plane of the second current restriction unit 1b. The effect of this higher impedance is that the higher-harmonic-wave current generated from the digital circuit block and transferring through the ground layer is prevented from flowing toward the radio circuit block whereby the electromagnetic coupling can be suppressed.

As described above, in the wireless portable device of the present embodiment, the effect of the current restriction structure is that the higher-harmonic-wave current is restricted from entering the radio circuit block out of the digital circuit block, and the radio-frequency current is restricted from entering the digital circuit block out of the radio circuit block. This suppresses the electromagnetic coupling between the radio circuit block and the digital circuit block, thereby assuring a more excellent quality for the wireless portable device.

Figure 6:
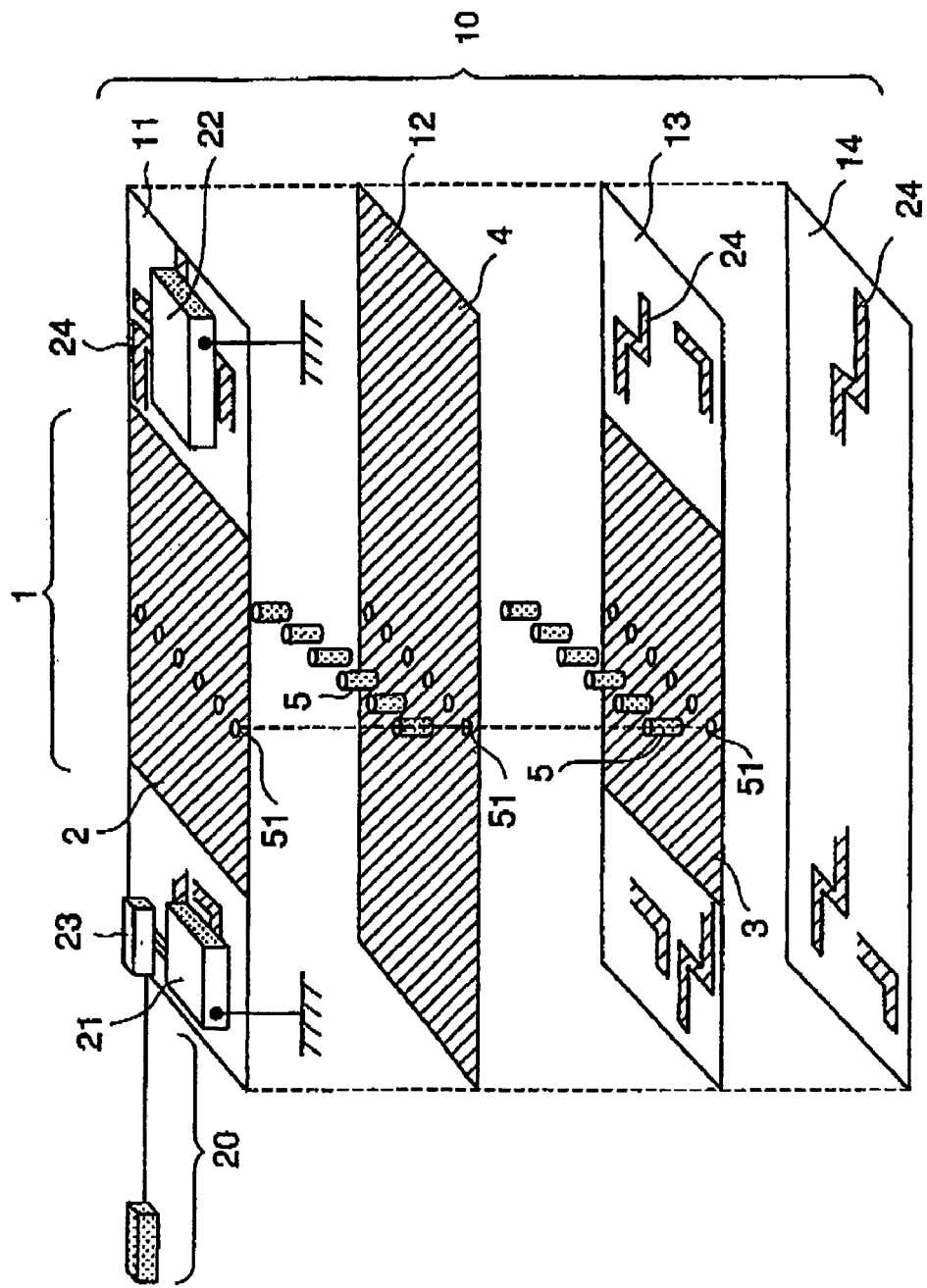
FIG. 6 is an exploded perspective view showing the structure of each layer of the printed circuit board in a wireless portable device according to a second embodiment of the present invention.
Figures 7A, 7B, 7C:
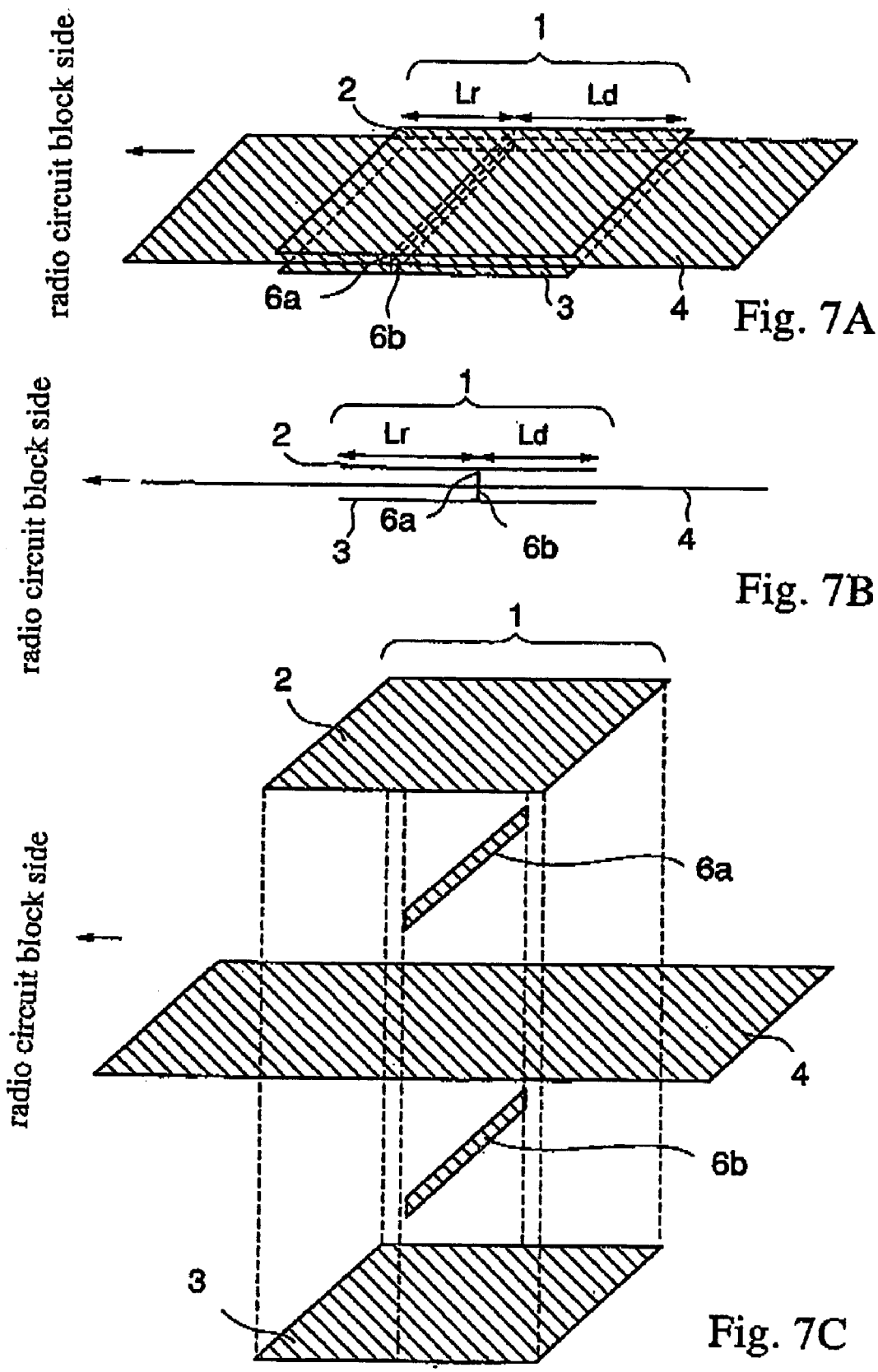
FIGS. 7A and 7B are perspective view and side view, respectively, of an equivalent current restriction structure in the wireless portable device according to the second embodiment of the present invention.
FIG. 7C is an exploded perspective view showing the structure of each layer of the printed circuit board.
Figure 8:
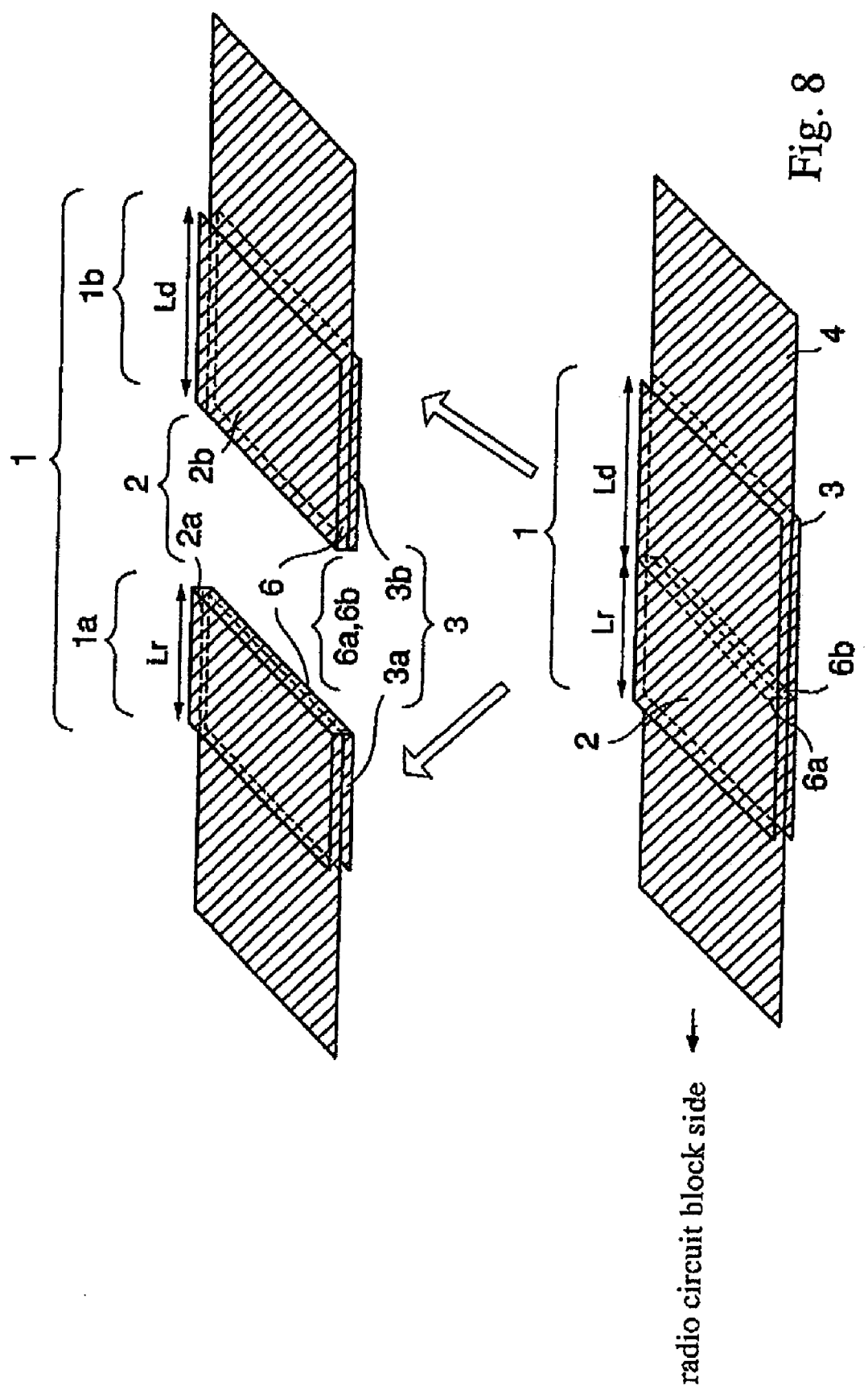
FIG. 8 shows first and second current restriction structures in the wireless portable device according to the second embodiment of the present invention.

Referring to FIGS. 5A, 5B and 6 showing a second embodiment of the present invention, the wireless portable device of the present embodiment is such that only via-hole arrays disposed on both lateral sides of the metallic planes in the wireless portable device of the first embodiment are removed. Also in this case, the width of the ground layer is equivalent to that of the circuit board, wherein the via-hole arrays are arranged at a narrow pitch and a high density to penetrate the first through third layers. Thus, the via-hole array can be construed equivalently as a metallic plate without problem, wherein the current restriction structure 1 can be equivalently expressed by the structure shown in FIG. 7. In this case, the current restriction structure 1 is such that the first current restriction unit 1a is mounted on the side at which the radio circuit block is disposed and the second current restriction unit 1b is mounted on the side at which the digital circuit block is disposed, with the short-circuiting plates 6 formed by the via-hole array being disposed back to back.

In the present embodiment, the principle is same as that of the first embodiment, although there is no metallic strip disposed on both the lateral sides (it is not a "tube" in a strict meaning; however, may constitute a rectangular cylindrical metallic tube in principle). More specifically, due to a higher input impedances at the respective open planes of the first and second current restriction units having lengths of $\lambda r/4$ and $\lambda d/4$, respectively, measured from the short-circuiting plate 6, the current generated from one of the circuit blocks is prevented from flowing to the other of the circuit blocks. Thus, the electromagnetic coupling can be suppressed similarly to the first embodiment.

In the first and second embodiments, there are shown wireless portable devices capable of suppressing the electromagnetic coupling between the radio circuit block and the digital circuit block.

Figure 9A:
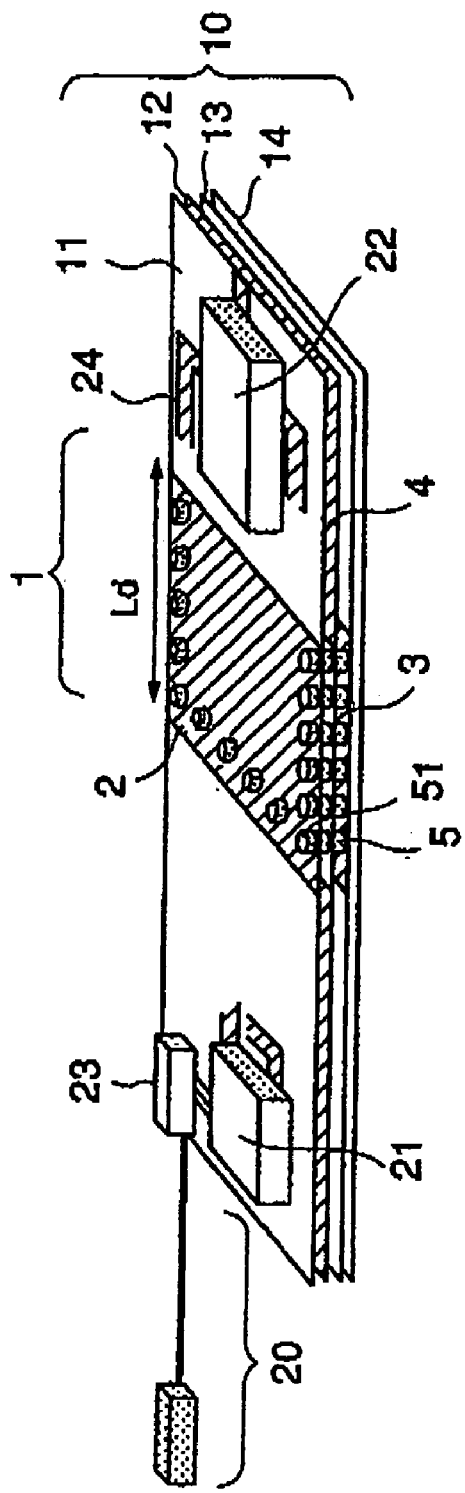
FIGS. 9A and 9B are perspective view and side view, respectively, of a wireless portable device according to a third embodiment of the present invention.
Figure 9B:
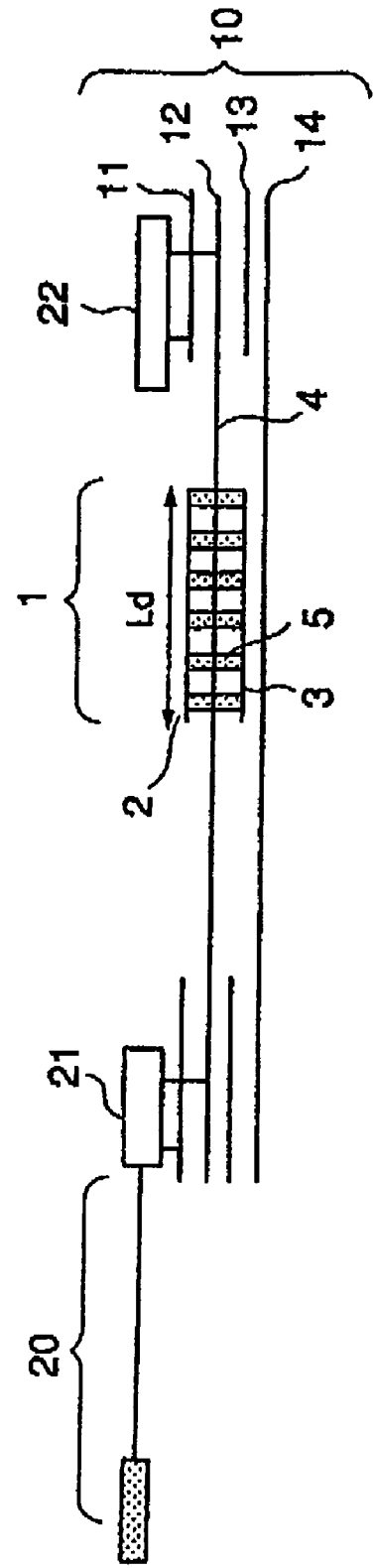
Figure 10:
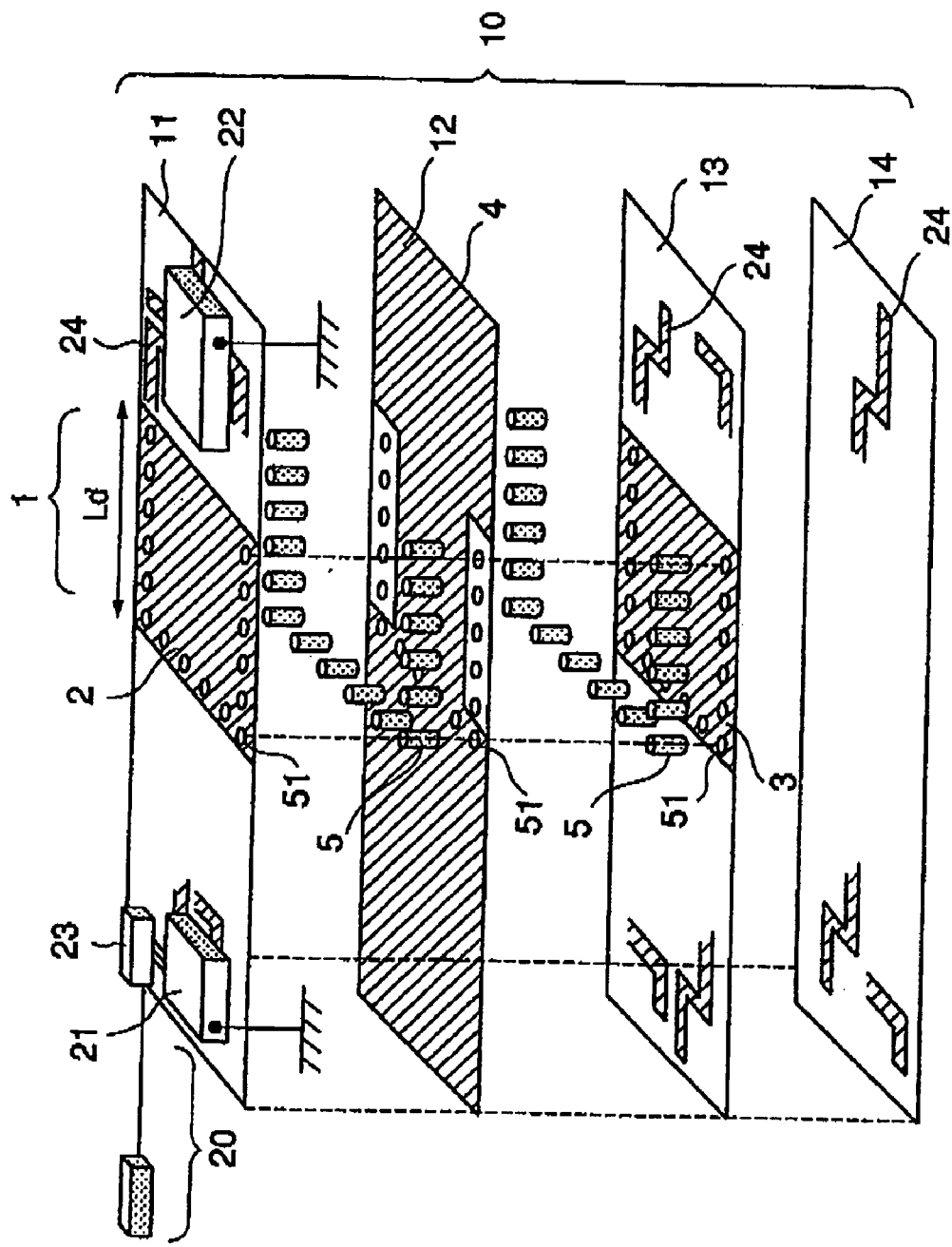
FIG. 10 is an exploded perspective view showing the structure of each layer of the printed circuit board of the wireless portable device according to the third embodiment of the present invention.

Referring to FIGS. 9A, 9B and 10 showing a third embodiment of the present invention, in a wireless portable device of the present embodiment, only a higher-harmonic-wave current entering the radio circuit block from the digital circuit block is noticed, and is restricted. These figures show a wireless portable device mounting thereon a current restriction structure for restricting the higher-harmonic-wave current from entering the radio circuit block out of the digital circuit block. The present embodiment has a configuration wherein only the second current restriction unit of the first embodiment is mounted, a single equivalent rectangular cylindrical metallic tube is provided, and a U-shape via-hole array is formed.

Figure 11A:
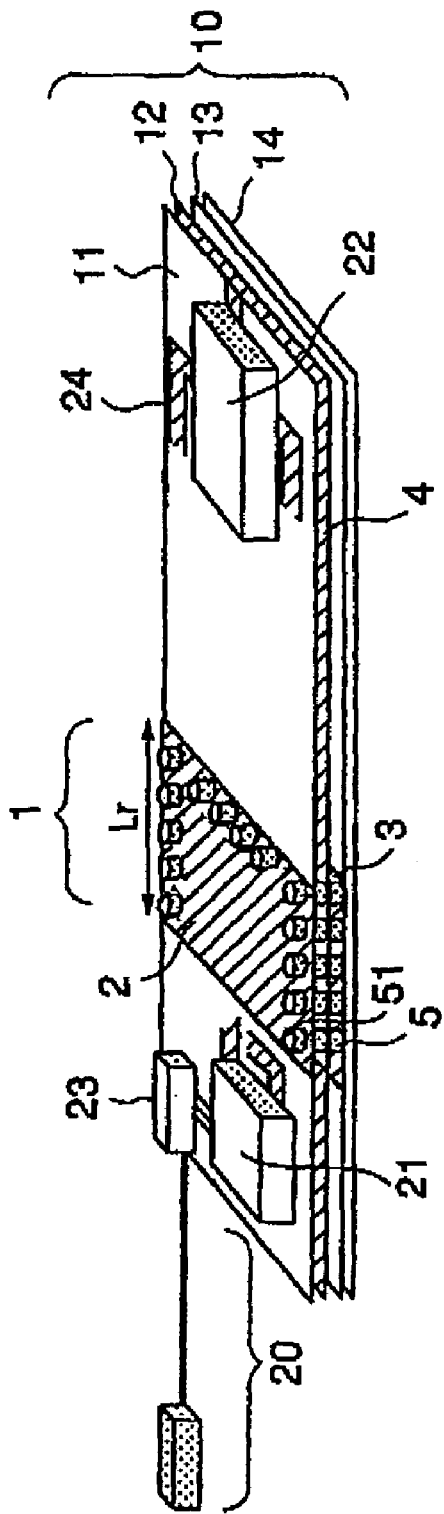
FIGS. 11A and 11B are perspective view and side view, respectively, of a wireless portable device according to a fourth embodiment of the present invention.
Figure 11B:
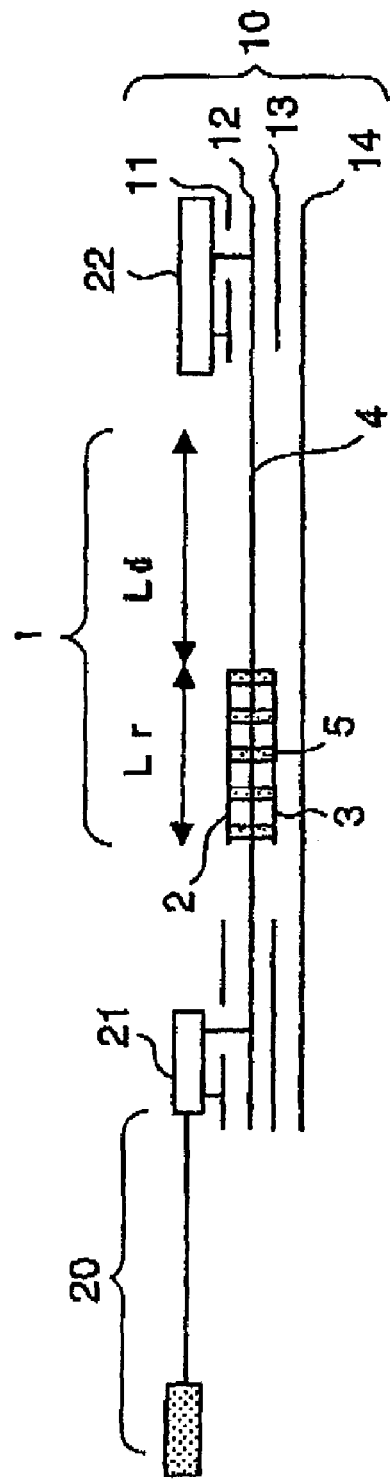
Figure 12:
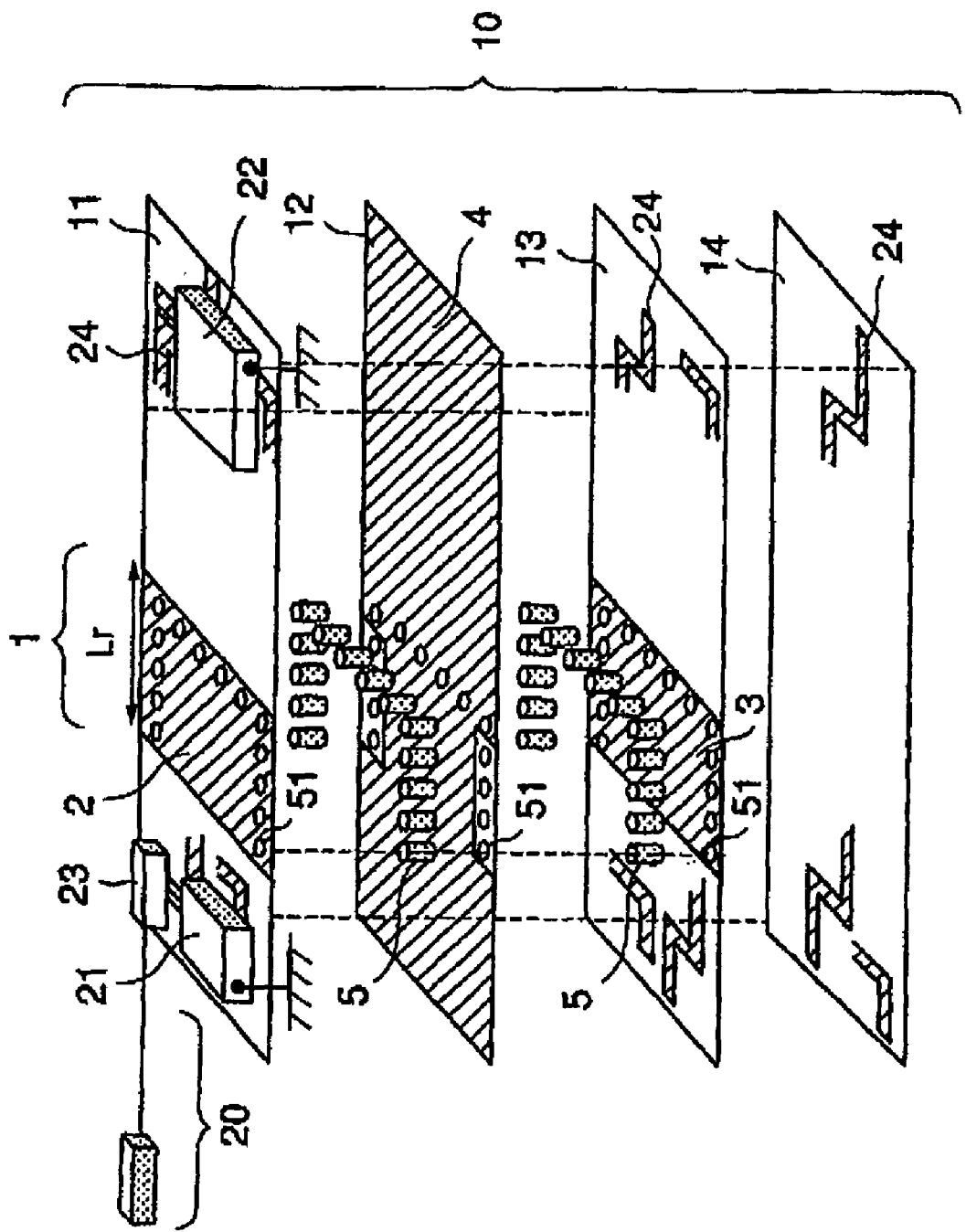
FIG. 12 is an exploded perspective view showing the structure of each layer of the printed circuit board of the wireless portable device according to the fourth embodiment of the present invention.

Similarly, as a configuration of a fourth embodiment of the present invention, the wireless portable device may mount thereon a current restriction structure for restricting the radio-frequency current from entering the digital circuit block out of the radio circuit block (FIGS. 11A, 11B and 12). The present embodiment has a configuration wherein only the first current restriction unit of the first embodiment is mounted, a single equivalent rectangular cylindrical metallic tube is provided, and a U-shape via-hole array is formed. The third and fourth embodiments have similar advantages for suppressing the electromagnetic coupling (in one direction).

Figure 13A:
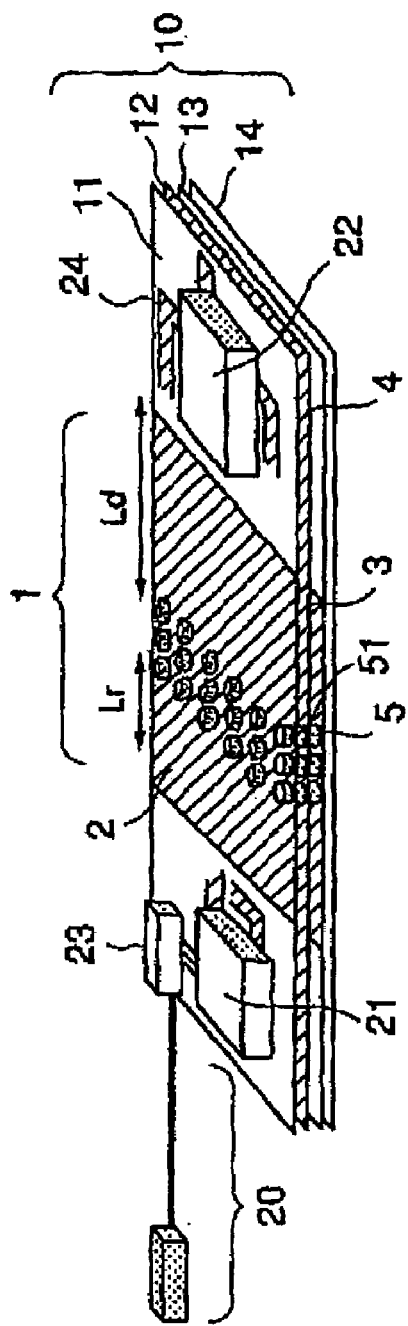
FIGS. 13A and 13B are perspective view and side view, respectively, of a wireless portable device according to a fifth embodiment of the present invention.
Figure 13B:
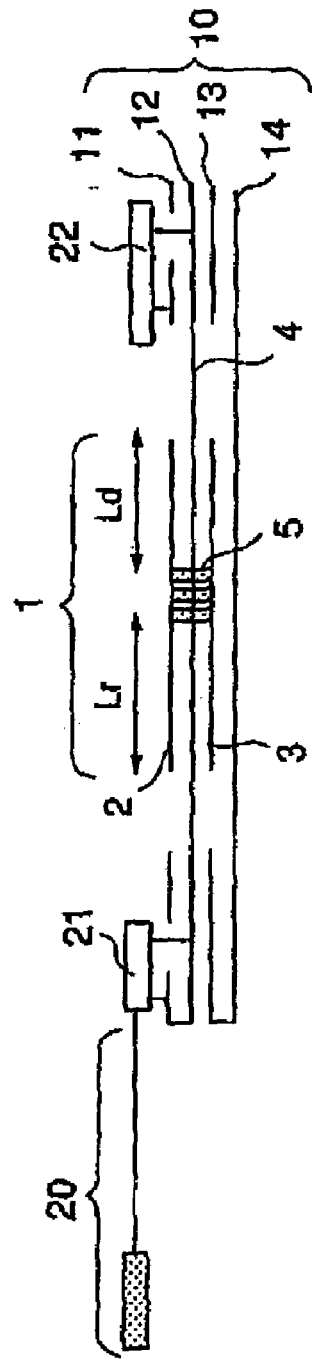

In the embodiments described heretofore, the via-hole array described therein has a single row. Referring to FIGS. 13A and 13B showing a fifth embodiment of the present invention, the wireless portable device of the present embodiment has a configuration wherein the via-hole array used in the second embodiment, for example, is arranged at a narrow pitch, in a cyclic manner and in a plurality of rows. Such a configuration allows enforcement of the connection of the overlying metallic plane 2, underlying metallic plane 3 and the ground layer 4 (physical enforcement of the connection). In addition, since a plurality of metallic plates are equivalently disposed therein, the function of the short-circuiting plate is more effective. Further, each of the via-hole arrays disposed on the lateral sides of the metallic planes may be arranged at a narrow pitch, in a cyclic manner, and in a plurality of rows. In this case, the connection between the metallic plane 2 overlying the ground layer and the metallic plane 3 underlying the ground layer can be enforced. In this way, each of some or all of the via-hole arrays may be arranged in a plurality of rows. As shown in FIG. 13, one of the outermost rows among a plurality of rows of the via-hole array is disposed on the location of the metallic plane apart from the end thereof in the direction of a line passing through the radio circuit block and the digital circuit block by ¼ of the wavelength of the subject current to be restricted. Thus, the length of the metallic plane is increased in the direction by the width of the plurality of rows of the via-hole array. Such a configuration wherein the via-hole array has a plurality of rows can be also employed in the embodiments to follow.

Figure 15:
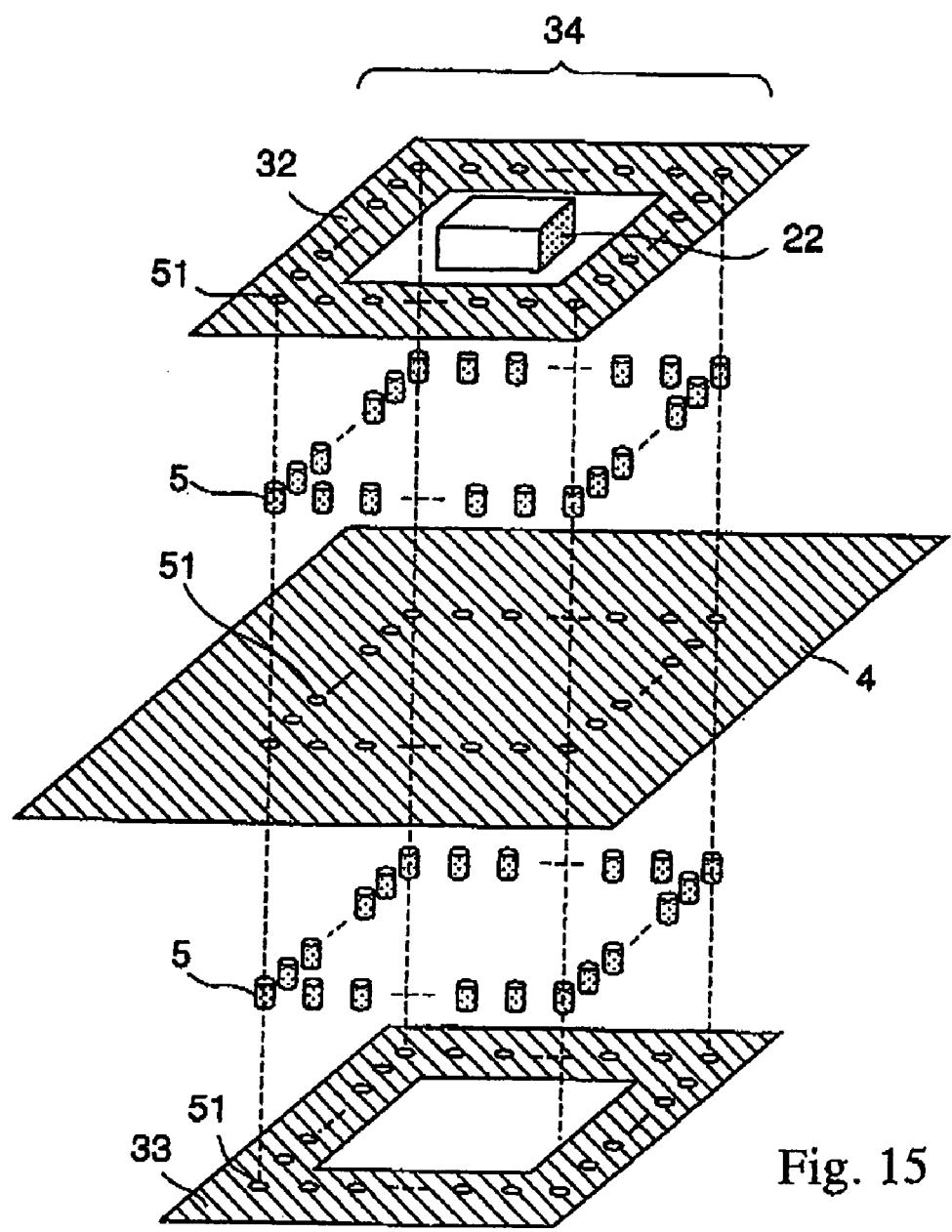
FIG. 15 is an exploded perspective view showing the structure of each layer of the printed circuit board in the wireless portable device according to the sixth embodiment of the present invention, with the current restriction structure therein shown at the center.
Figure 16A:
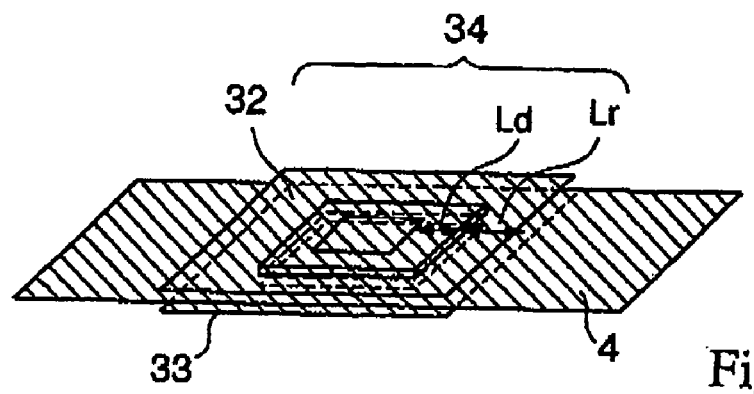
FIGS. 16A and 16B are perspective view and side view, respectively, of an equivalent current restriction structure in the wireless portable device according to the sixth embodiment of the present invention.
Figure 16B:
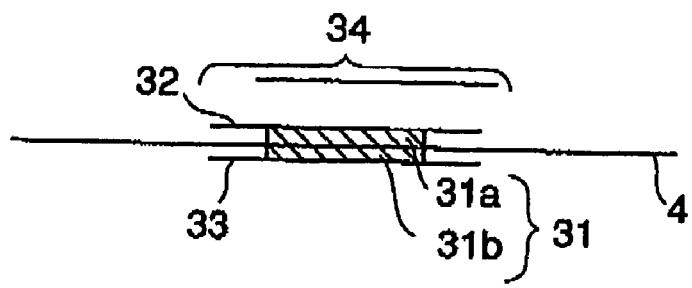
Figure 16C:
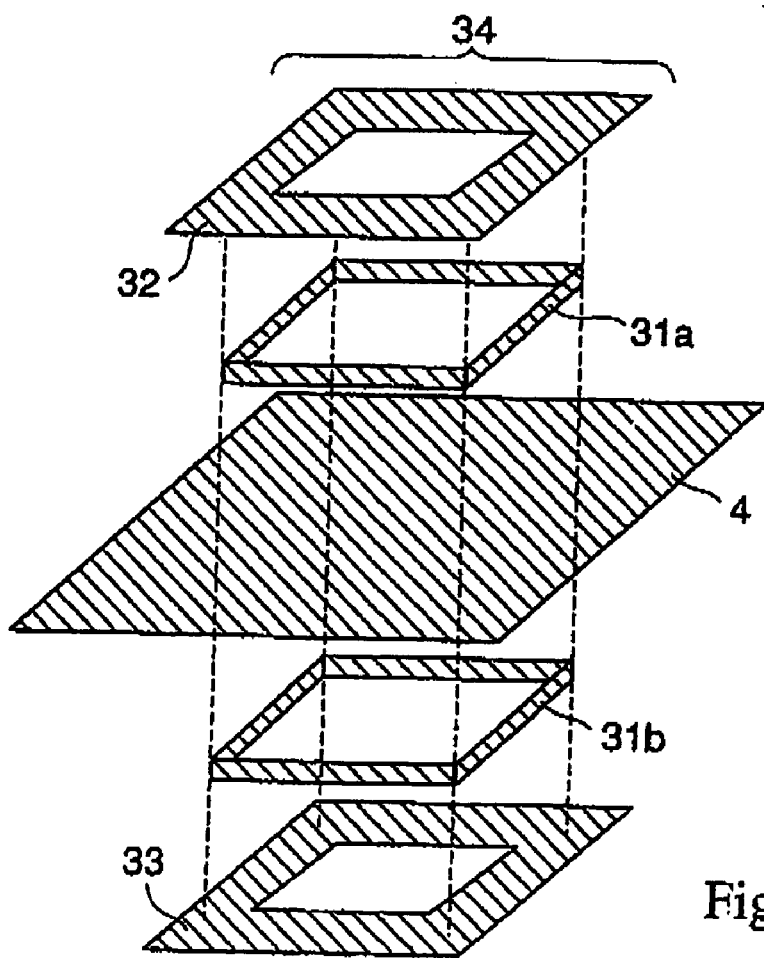
FIG. 16C is an exploded view showing the structure of each layer.

Referring to FIGS. 14A, 14B and 15 showing a sixth embodiment of the present invention, the digital circuit block is disposed in the vicinity of the center of the printed circuit board for the sake of convenience. More concretely, the wireless portable device of the present embodiment has a configuration wherein a □-shaped current restriction structure 34 is mounted on the circumference of the digital circuit block. This corresponds to the configuration wherein the current restriction structure 1 described in connection with the first through fifth embodiments is disposed to encircle the digital circuit block 22, and the basic structures thereof such as the film structure are similar to those of those embodiments.

In the present embodiment, the □-shaped metallic planes (overlying metallic plane 32 and underlying metallic plane 33) are disposed parallel to the overlying and underlying layers (first layer and third layer) to sandwich therebetween the ground layer. Each of the metallic planes is configured to a pattern having therein an opening, which is somewhat larger than the size of the periphery of the digital circuit block, and having a widthwise length of Lr+Ld as in the cases of the above embodiments. The via-hole array is disposed apart from the inner edge of the metallic plane by a desired distance (Ld) to form a □-shape, wherein individual via-holes penetrate from the first layer to the third layer. The overlying and underlying metallic planes and the ground layer are connected together at the locations at which the via-holes reside, and the spacing of adjacent via-holes is considerably smaller than the wavelength to be considered and thus adapted to a narrow pitch and high density mounting. Thus, the via-hole array can be construed as a metallic plate also in this case. The □-shaped via-hole array is located at a distance of Ld apart from the inner edge of the metallic plane and at a distanced of Lr apart from the outer edge thereof, whereby these lengths are set at ¼ of the wavelengths of the subject currents to be restricted.

Figure 17:
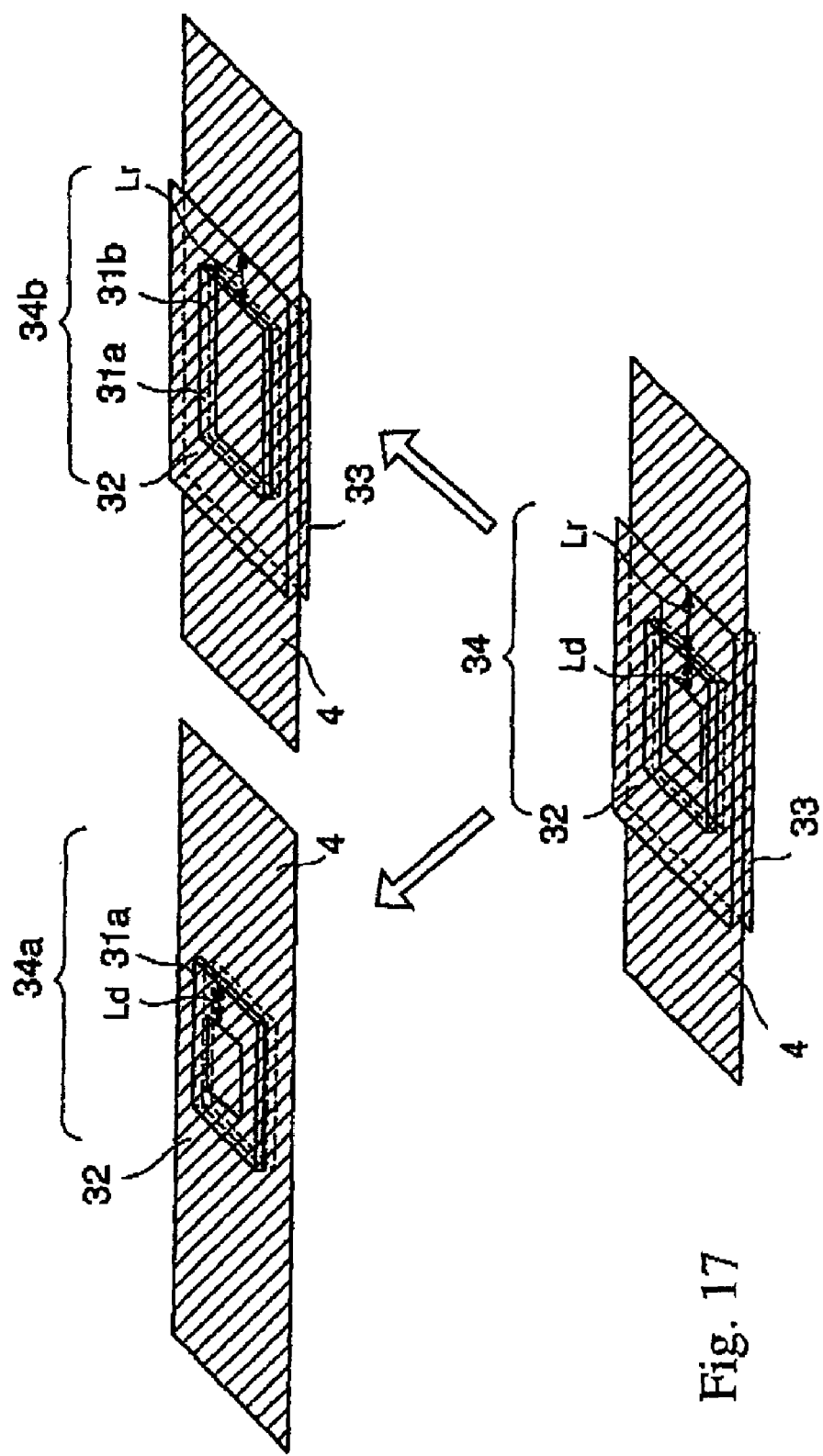
FIG. 17 shows the first and second □-shaped rectangular current restriction structures in the wireless portable device according to the sixth embodiment of the present invention.

FIGS. 16A to 16C and 17 show the □-shaped current restriction structure 34 wherein the via-hole array is equivalently construed as a metallic plate. FIG. 17 illustrates the □-shaped first and second current restriction units in the present embodiment. As shown in these figures, this can be construed as a structure of two lopped current restriction units mounted, wherein the □-shaped short-circuiting plates 31 (31*a* and 31*b*) implemented by the via-hole array are disposed back to back. The first □-shaped current restriction unit 34*a* is mounted on the inner side (the side at which the digital circuit block is mounted) of the via-hole array constituting a boundary, and is implemented by □-shaped metallic planes (32 and 33) each having a short-circuited distal end and a widthwise length, Ld, equal to ¼ of the wavelength λd of the subject higher-harmonic-wave current. The □-shaped second current restriction unit 34*b* is mounted on the outer side, and is implemented by □-shaped metallic planes (32 and 33) each having a short-circuited distal end and a widthwise length, Lr, equal to ¼ of the wavelength λr of the subject radio-frequency current. Thus, the □-shaped first current restriction unit 34*a*, as disposed to surround the digital circuit block 22 and having a higher impedance at the open plane directed inwardly, can suppress the higher-harmonic-wave current from flowing out of the digital circuit block to the circumference thereof. As a result, entering of the higher-harmonic-wave current to the radio circuit block, for example, can be restricted, thereby suppressing the electromagnetic coupling. Similarly, the □-shaped second current restriction unit 34*b* has an open plane directed outwardly. Accordingly, entering of the current to the digital circuit block from nearby circuit blocks etc. is restricted, thereby suppressing the electromagnetic coupling. In the present embodiment, although the shape of the current restriction structure is inadequate to be referred to as "tube", the advantage of the rectangular cylindrical metallic tube in the present embodiment is basically similar to those of the above embodiments.

In the above first through fifth embodiments, the current restriction units are disposed between the circuit blocks which is may involve an electromagnetic coupling therebetween, having an effect on the current flowing into the ground layer of the printed circuit board. On the other hand, in the present embodiment, the □-shaped current restriction structure is disposed to surround the location at which the current is generated (the circuit block surrounded may be either a digital circuit block as in the present embodiment or a radio circuit block). Thus, the present embodiment has the advantage of restricting the current, which may possibly cause the electromagnetic coupling, from flowing onto the printed circuit board. It is to be noted that a printed circuit board may have eight layers or sixteen layers, for example, other than the four layers in the wireless portable device of the present invention, although the four-layer circuit boards are exemplified heretofore. In addition, although the metallic planes (2 and 3) formed to overlie and underlie the ground layer are included in the signaling layer and the power source layer (first layer and third layer), respectively, independent layers having the metallic planes may be provided separately from these layers. Or else, it is possible to employ a configuration wherein either one of the overlying and underlying metallic planes is included in the signaling layer or the power source layer.

Figure 18:
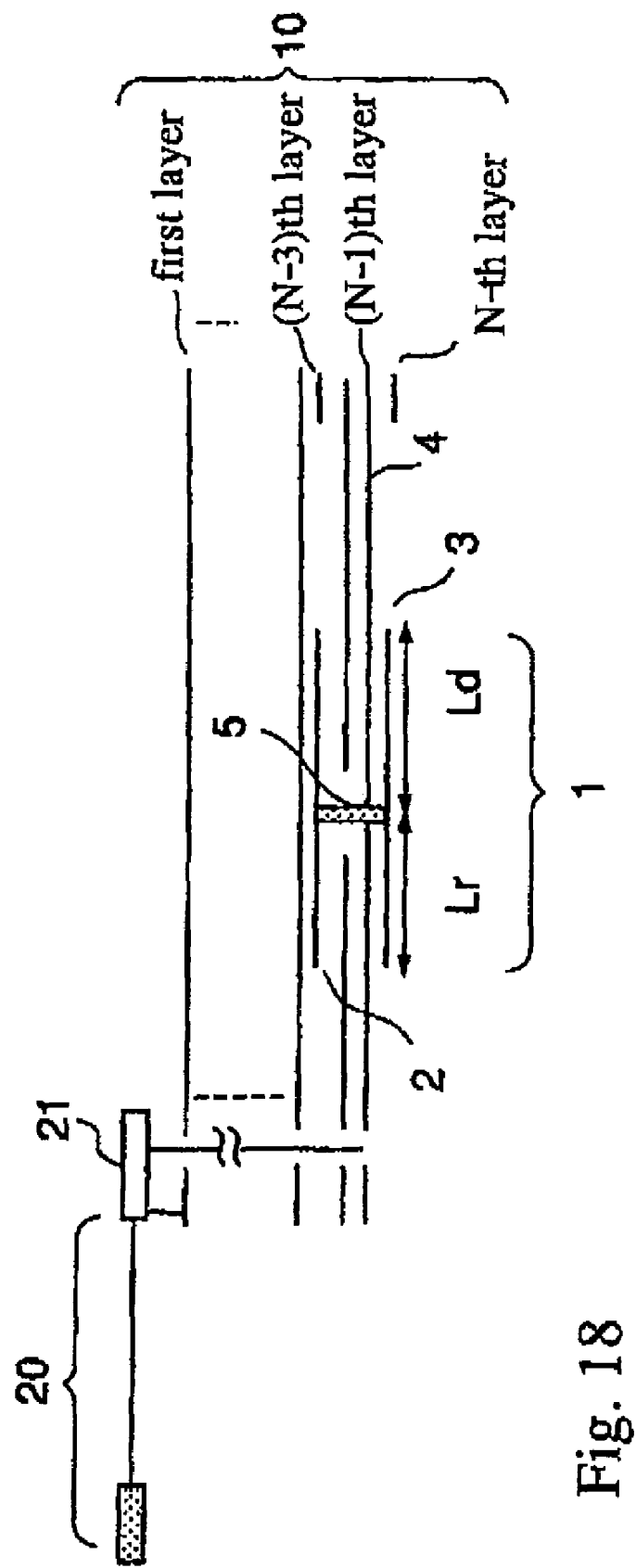
FIG. 18 is a cross-sectional view showing a wireless portable device according to a seventh embodiment of the present invention.
Figure 21A:
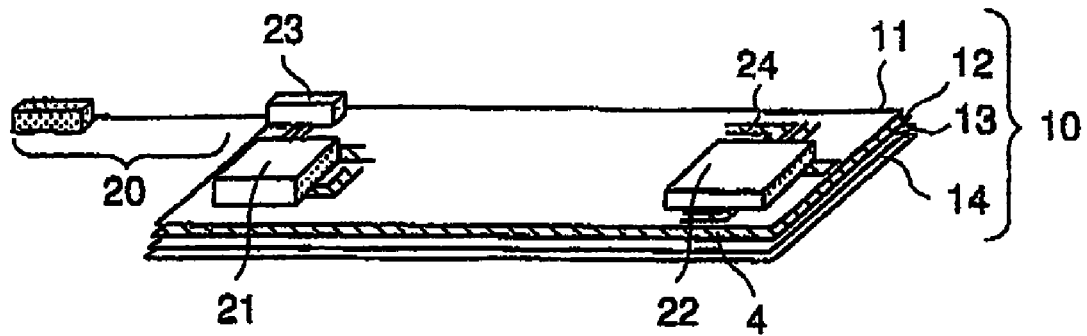
FIGS. 21A and 21B are perspective view and side view, respectively, of a typical wireless portable device of a prior art.
Figure 21B:
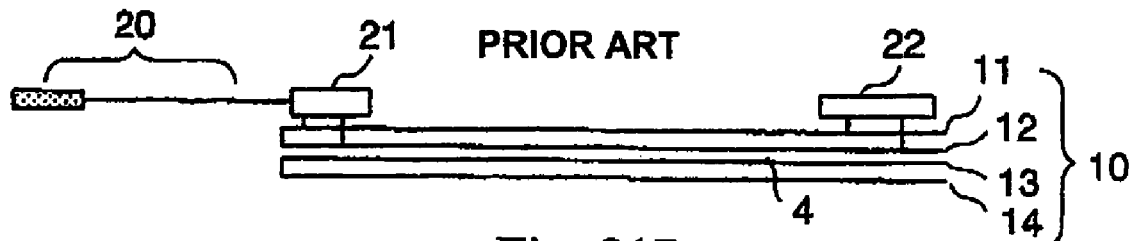
Figure 21C:
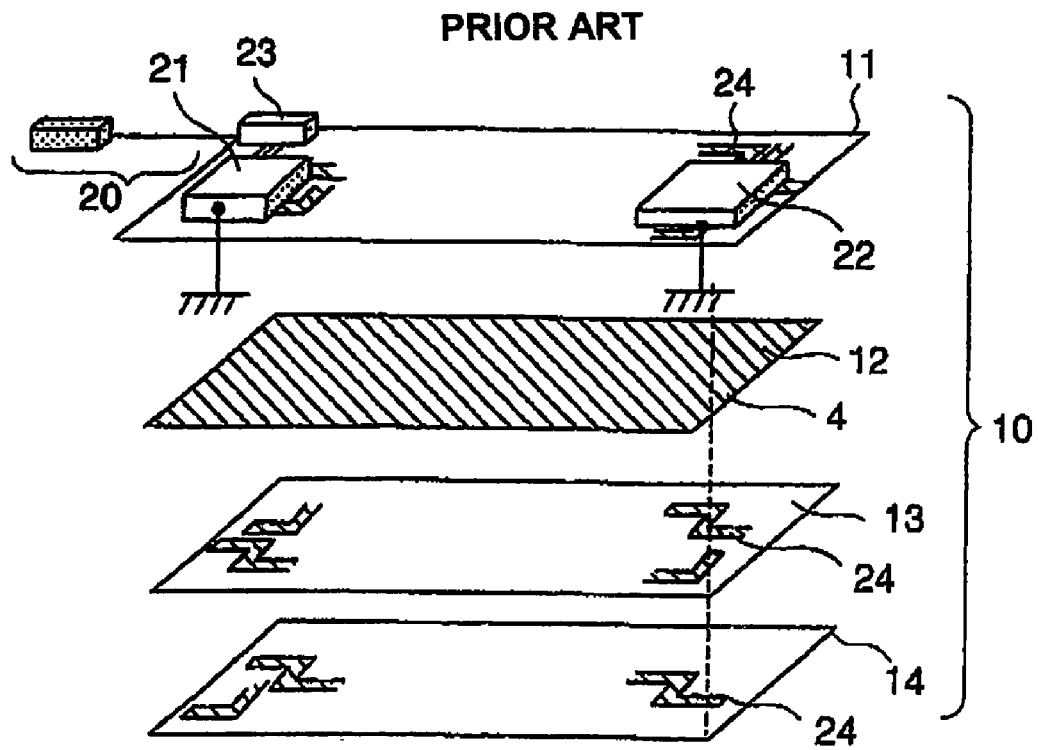
FIG. 21C is an exploded view showing the structure of each layer of the printed circuit board.
Figure 22A:
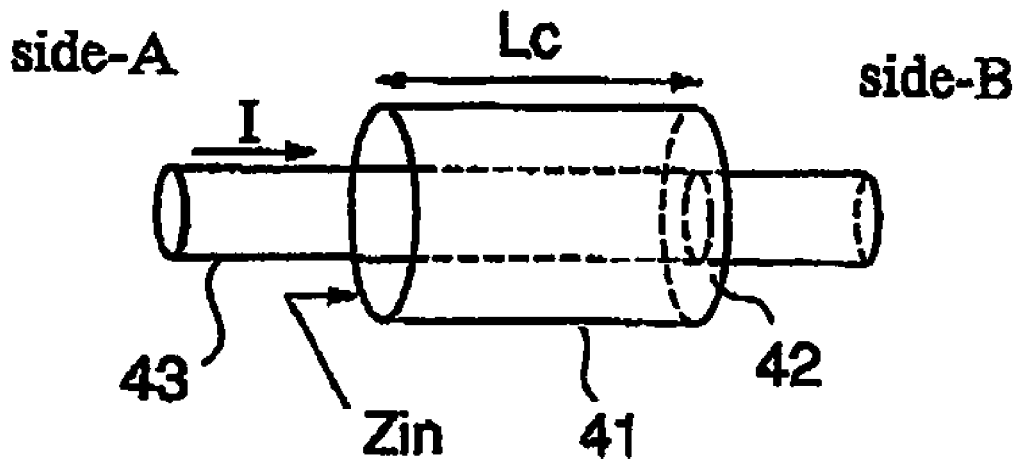
FIGS. 22A and 22B are respectively a perspective view of the structure restricting the current on a typical cable in the prior art and a sectional view taken on the central plane of the cable.
Figure 22B:
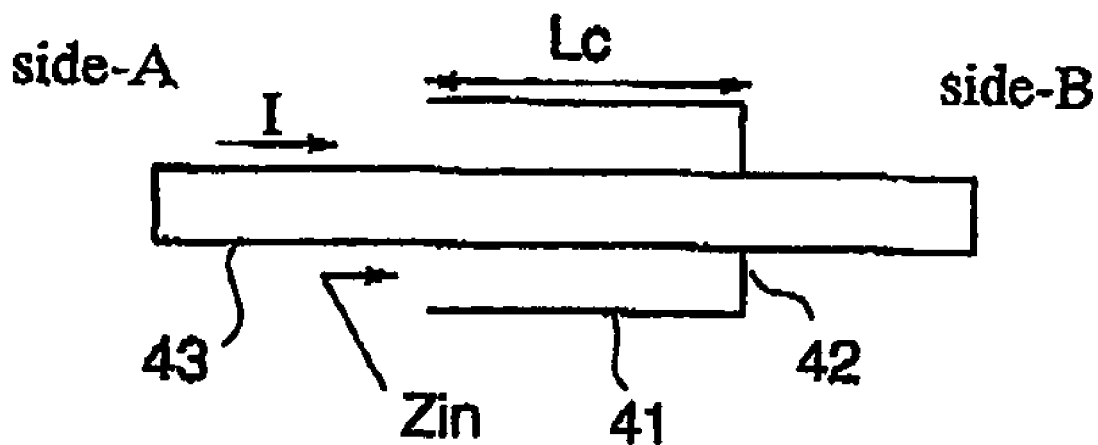

In the embodiments to follow, modifications from the above embodiments will be exemplified. The advantages of the present invention in the modifications are also similar to those in the above embodiments. Referring to FIG. 18 showing a seventh embodiment of the present invention, the overlying and underlying metallic planes are formed respectively on first layers, when numbered from the ground layer, in the wireless portable device of the present embodiment; however, the layers having the metallic planes may be disposed in any of the layers so long as these layers overlie and underlie the ground layer. For example, in the case of N-layer circuit board shown in FIG. 18, the overlying metallic plane may be formed on the (N−3)-th layer and the underlying metallic plane may be formed on the N-th layer, assuming that the ground layer resides on the (N−1)-th layer etc.

It is to be noted that some of the package casings for the wireless portable devices may be made of a metallic material, although most of them are made of a nonmetallic material such as plastics or resin. In such a case, a current which may possibly cause the electromagnetic coupling may flow on the surface of the package casing. For suppressing the electromagnetic coupling caused by such a current, as shown in FIG. 19, the current restriction structure of the present invention may be applied to the casing 52, assuming that the metallic package casing 52 is an equivalent ground layer. This structure may be such that the rectangular cylindrical metallic tube covers the metallic package casing for substantially complete enclosure thereof, and a short-circuiting plate is connected thereto for short-circuiting together the metallic package casing and the rectangular cylindrical tube at the position Lr apart from one end of the rectangular cylindrical metallic tube (or Ld apart from the other end thereof). As will be understood from the same figure, this configuration corresponds to the configuration wherein the current restriction structure implemented by the metallic plate shown in FIG. 3 is applied to the metallic package casing 52. In this figure, only the ground layer shown in FIG. 3 is replaced by the metallic package casing 52. Accordingly, the advantage is similar to those in the embodiments described heretofore, whereby the electromagnetic coupling caused by the current on the package casing can be suppressed.

Referring to FIG. 20 showing a ninth embodiment of the present invention, the wireless portable device of the present embodiment is such that the current restriction structure in the second embodiment is applied to a metallic package casing for the case using the metallic package casing 52 as well. Also in this case, only the ground layer is replaced by the metallic package casing. Thus, the advantage is similar to those in the embodiments described heretofore. Essentially, the length of the metallic strip of the current restriction structure is equal to ¼ of the wavelength of the subject current. In the present embodiment, a magnetic member 50 (or an insulator member 50) is embedded between the ground layer and the metallic plane, thereby intending to reduce the size of the metallic plane to take advantage of the wavelength reduction effect (FIG. 20). It is to be noted that the present invention is not limited to application to the wireless portable device such as portable cellular phone and personal data assistant, and may be applied to general electronic or electric appliances. For example, in an electronic or electric appliance, a magnetic coupling may occur between a digital circuit block and an analog circuit block (corresponding to the radio circuit block in the present invention). The present invention, if applied to such a case, has a similar advantage.

As described above, in the wireless portable device of each embodiment of the present invention, since the current restriction structure restricts the higher-harmonic-wave current from entering the radio circuit block out of the digital circuit block, and the radio-frequency current from entering the digital circuit block out of the radio circuit block, the electromagnetic coupling between the digital circuit block and the radio circuit block can be suppressed to assure a higher quality.

The invention claimed is:

1. A wireless portable device comprising, on a single printed circuit board:
    a radio circuit block for processing signals received/transmitted from/to a base station;
    a digital circuit block for processing digital signals in data processing; and
    a current restriction structure disposed between said radio circuit block and said digital circuit block,
    wherein, said current restriction structure restricts a radio frequency current generated in said radio circuit block and transferred through a ground layer of said printed circuit board from entering said digital circuit block, and/or a higher-harmonic-wave current generated in said digital circuit block and transferred through said ground layer of said printed circuit board from entering said radio circuit block.

2. A wireless portable device comprising, on a single printed circuit board, a radio circuit block for processing signals received/transmitted from/to a base station;
    a digital circuit block for processing digital signals in data processing; and
    a current restriction structure disposed between both said circuit blocks, wherein,
    said current restriction structure is implemented by at least one metallic tube for restricting a subject current to be restricted, which is either of a radio frequency current generated in said radio circuit block and a higher-harmonic-wave current generated in said digital circuit block, from transferring out of one of said circuit blocks to the other of said circuit blocks via a ground layer on said printed circuit board; and
    said metallic tube is implemented by metallic planes and a via-hole array which are configured to enclose said subject current and have a short-circuiting plate at a distal end thereof, and a distance between an open plane of said metallic tube opposing one of said both circuit blocks and said short-circuiting plate is set at ¼ of a wavelength of said subject current, to thereby obtain a higher impedance at said open plane to restrict said entering.

3. The wireless portable device according to claim 2, wherein,
    said current restriction structure includes a first current restriction unit configured as an equivalent rectangular cylindrical metallic tube for restricting said radio-frequency current generated in said radio circuit block, and a second current restriction unit configured as another equivalent rectangular cylindrical metallic tube for restricting said higher-harmonic-wave current generated in said digital circuit block; and
    said first current restriction unit and said second current restriction unit are coupled together back to back so that said short-circuiting plates connected to distal ends of said first current restriction unit and said second current restriction unit are common.

4. The wireless portable device according to claim 2, wherein said current restriction structure includes either one of a first current restriction unit implemented by an equivalent rectangular cylindrical metallic tube for restricting said radio-frequency current generated in said radio circuit block, and a second current restriction unit implemented by another equivalent rectangular cylindrical metallic tube for restricting said higher-harmonic-wave current generated in said digital circuit block.

5. A wireless portable device comprising, on a single printed circuit board, a radio circuit block for processing signals received/transmitted from/to a base station;

a digital circuit block for processing digital signals in data processing; and a current restriction structure disposed between both said circuit blocks for restricting a subject current to be restricted, wherein, said subject current is either a radio-frequency current generated in said radio circuit block or a higher-harmonic-wave current generated in said digital circuit block from entering one of said circuit blocks out of the other of said circuit blocks via a ground layer of said printed circuit board, wherein, said current restriction structure includes a first metallic plane overlying and parallel to said printed circuit board, a second metallic plane underlying and parallel to said printed circuit board, and equivalent metallic plane implemented by a via-hole array.

6. The wireless portable device according to claim 5, wherein:

said first metallic plane and second metallic plane have a length set at a sum (Lr+Ld) of a length Lr equal to ¼ of a wavelength of said radio-frequency current and a length Ld equal to ¼ of a wavelength of said higher-harmonic-wave current, in the direction connecting ends of said both circuit blocks together, and a width set equal to a width of said printed circuit board, in a direction normal to the direction connecting said ends of both said circuit blocks together; and said equivalent metallic plane implemented by said via-hole array is formed by arranging via-holes linearly at a narrow pitch at a location of said first and second metallic planes, which is Lx apart from an end of said radio circuit block and Ld apart from an end of said digital circuit block, said via-holes penetrating through a ground layer of said printed circuit board.

7. The wireless portable device according to claim 5, wherein:

said first metallic plane and second metallic plane have a length set at a sum (Lr—Ld) of a length Lr equal to ¼ of a wavelength of said radio-frequency current and a length Ld equal to ¼ of a wavelength of said higher-harmonic-wave current, in the direction connecting ends of said both circuit blocks together, and a width set larger than a width of said ground layer of said printed circuit board in a direction normal to the direction connecting said ends of said both circuit blocks together;

said equivalent metallic plane implemented by said via-hole array is formed by arranging via-holes linearly at a narrow pitch at a location of said first and second metallic planes, which is Lr apart from an end of said radio circuit block and Ld apart from an end of said digital circuit block, said via-holes penetrating through said ground layer of said printed circuit board, and by arranging other via-holes linearly at a narrow pitch at locations of said first and second metallic planes, which are substantially aligned with both ends of said printed circuit board in a direction normal to said direction connecting said ends of said both circuit blocks together, said other via-holes penetrating locations of said printed circuit board other than a location of said ground layer.

8. The wireless portable device according to claim 5, wherein:

said current restriction structure is configured to restrict either one of said subject currents;

said first metallic plane and said second metallic plane have a length equal to ¼ of a wavelength of said either one of said subject currents in a direction connecting ends of both said circuit blocks together;

said equivalent metallic plane implemented by said via-hole array is configured to form a U-shape by arranging via-holes linearly at a narrow pitch and at ends of said first and second metallic planes far from one of both said circuit blocks generating said either one of said subject currents to penetrate said printed circuit board at said ground layer, and by arranging other via-holes linearly at a narrow pitch at locations of said first and second metallic planes, which are substantially aligned with both ends of said printed circuit board in a direction normal to said direction connecting said ends of said both circuit blocks together to penetrate locations of said printed circuit board other than a location of said ground layer.

9. The wireless portable device according to claim 5, wherein said first metallic plane and said second metallic plane are of a parallelogram-shape having an opening therein somewhat larger than a size of a periphery of either one of both said circuit blocks, and having a width equal to a sum (Lr+Ld) of a length Lr equal to ¼ of a wavelength of said radio-frequency current and a length Ld equal to ¼ of a wavelength of said higher-harmonic-wave current, and are disposed as overlying and underlying layers parallel to said printed circuit board so as to surround said either one of both said circuit blocks; and via-holes are arranged at a narrow pitch and at a location of said—shaped first and second metallic planes which is apart from an inner edge thereof by ¼ of a wavelength of said subject current generated by said either one of both said circuit blocks, said via-holes penetrating said ground layer of said printed circuit board.

10. The wireless portable device according to any one of claims 6 to 9, wherein:

a part or whole of said equivalent metallic plane implemented by said via-hole array is configured by a plurality of rows of via-holes arranged on said first and second metallic planes at a narrow pitch; and for arranging said via-hole array at the location of said first and second metallic planes which is apart from one end or both ends thereof by ¼ of said wavelength of said subject current, a distance between said one end or both ends and an outermost row of said via-hole array among said plurality of rows is set at ¼ of the wavelength of said subject current, and the length of said first and second metallic planes is increased by the width of said plurality of rows.

11. The wireless portable device according to claim 10, wherein, for the case wherein said printed circuit board is sandwiched between an overlying printed circuit board and an underlying printed circuit board to form a multi-layer printed circuit board;

one or both of said first and second metallic planes is included in either one or both of a signaling layer and a power source layer provided in said multi-layer printed circuit boards.

12. The wireless printed circuit board according to claim 10, wherein, for the case wherein said printed circuit board is received in a metallic package casing, said current restriction structure is applied thereto while construing said metallic package casing as said ground layer of said printed circuit board.

13. The wireless portable device according to any one of claims 6 to 9, wherein, for the case wherein said printed circuit board is sandwiched between an overlying printed circuit board and an underlying printed circuit board to form a multi-layer printed circuit board;
  one or both of said first and second metallic planes is included in either one or both of a signaling layer and a power source layer provided in said multi-layer printed circuit boards.

14. The wireless printed circuit board according to claim 13, wherein, for the case wherein said printed circuit board is received in a metallic package casing, said current restriction structure is applied thereto while construing said metallic package casing as said ground layer of said printed circuit board.

15. The wireless printed circuit board according to any one of claims 6 to 9, wherein, for the case wherein said printed circuit board is received in a metallic package casing, said current restriction structure is applied thereto while construing said metallic package casing as said ground layer of said printed circuit board.

16. The wireless printed circuit board according to claim 15, wherein a material having a wavelength reduction effect for the current is provided between said package casing and said current restriction structure.

* * * * *

UNITED STATES PATENT AND TRADEMARK OFFICE
CERTIFICATE OF CORRECTION

| | | |
|---|---|---|
| PATENT NO. | : 7,164,898 B2 | Page 1 of 1 |
| APPLICATION NO. | : 10/474756 | |
| DATED | : January 16, 2007 | |
| INVENTOR(S) | : Eiji Hankui | |

It is certified that error appears in the above-identified patent and that said Letters Patent is hereby corrected as shown below:

In the title: delete "WIRELESS PORTABLE DEVICE" and insert -- WIRELESS PORTABLE CAPABLE OF SUPPRESSING ELECTROMAGNETIC COUPLING BETWEEN RADIO CIRCUIT BLOCK AND DIGITAL CIRCUIT BLOCK --

Col 1, line 26; delete "23" and insert -- 22 --

Col 1, line 27; delete "bock" and insert -- block --

Col 1, line 30; delete "bock" and insert -- block --

Claim 1, col 12, line 12; after "a" insert -- common --

Claim 1, col 12, line 15; after "said" insert -- common --

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,164,898 B2 | Page 1 of 1 |
| APPLICATION NO. | : 10/474756 | |
| DATED | : January 16, 2007 | |
| INVENTOR(S) | : Eiji Hankui | |

It is certified that error appears in the above-identified patent and that said Letters Patent is hereby corrected as shown below:

In the title Item [54] and Column 1, line 1: delete "WIRELESS PORTABLE DEVICE" and insert -- WIRELESS PORTABLE CAPABLE OF SUPPRESSING ELECTROMAGNETIC COUPLING BETWEEN RADIO CIRCUIT BLOCK AND DIGITAL CIRCUIT BLOCK --

Col 1, line 26; delete "23" and insert -- 22 --

Col 1, line 27; delete "bock" and insert -- block --

Col 1, line 30; delete "bock" and insert -- block --

Claim 1, col 12, line 12; after "a" insert -- common --

Claim 1, col 12, line 15; after "said" insert -- common --

This certificate supersedes the Certificate of Correction issued September 23, 2008.

Signed and Sealed this

Fourteenth Day of October, 2008

JON W. DUDAS
*Director of the United States Patent and Trademark Office*